United States Patent
Nakakubo

(10) Patent No.: US 8,020,613 B2
(45) Date of Patent: Sep. 20, 2011

(54) HEAT TRANSFER CONTROLLING MECHANISM AND FUEL CELL SYSTEM HAVING THE HEAT TRANSFER CONTROLLING MECHANISM

(75) Inventor: Toru Nakakubo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 242 days.

(21) Appl. No.: 12/161,408

(22) PCT Filed: Oct. 24, 2007

(86) PCT No.: PCT/JP2007/071164
§ 371 (c)(1),
(2), (4) Date: Jul. 18, 2008

(87) PCT Pub. No.: WO2008/050894
PCT Pub. Date: May 2, 2008

(65) Prior Publication Data
US 2010/0221627 A1    Sep. 2, 2010

(30) Foreign Application Priority Data
Oct. 27, 2006   (JP) .................. 2006-293329

(51) Int. Cl.
F28D 15/02     (2006.01)
H01M 8/04      (2006.01)
H01M 8/06      (2006.01)
H01M 8/08      (2006.01)

(52) U.S. Cl. .............. 165/272; 165/274; 165/104.26; 165/300; 236/34; 236/34.5; 429/434; 429/435; 429/436; 429/437; 429/438; 429/120

(58) Field of Classification Search .............. 165/272, 165/274, 104.26, 300; 236/34, 34.5; 429/434, 429/435, 436, 437, 438, 120
See application file for complete search history.

(56) References Cited

U.S. PATENT DOCUMENTS
2,846,396 A  *  8/1958  Arnold et al. ................ 236/34
(Continued)

FOREIGN PATENT DOCUMENTS
JP             6-260202 A        9/1994
(Continued)

OTHER PUBLICATIONS

Dorian Liepmann, "Design and Fabrication of a Micro-cpl for Chip-level Cooling," Proceedings of 2001 ASME International Mechanical Engineering Congress and Exposition 1-4 (Nov. 2001).
(Continued)

*Primary Examiner* — John Ford
(74) *Attorney, Agent, or Firm* — Fitzpatrick, Cella, Harper & Scinto

(57) ABSTRACT

A heat transfer controlling mechanism and a fuel cell system, which allow working fluid to flow in a predetermined direction in a loop-shaped flow path without a back flow, having a simple structure independent of the orientation during use, low power consumption, and efficient heat transfer and size reduction. The mechanism includes a vaporizing portion, a condensing portion, and a loop-shaped flow path connecting the vaporizing and the condensing portions so as to seal working fluid. The mechanism transports heat by vaporizing the fluid in the vaporizing portion and condensing the fluid in the condensing portion to control heat transfer. The mechanism further includes a gas passage suppressing portion on one side in the flow path, for allowing liquid, but not gas, to pass therethrough and a liquid passage suppressing portion on the other side in the flow path, for allowing gas, but not liquid, to pass therethrough.

2 Claims, 23 Drawing Sheets

|  | HIGH TEMPERATURE PORTION | LOW TEMPERATURE PORTION |
|---|---|---|
| VAPOR FLOW PATH | HEAT TRANSFERRED WHEN HIGH TEMPERATURE PORTION IS AT PREDETERMINED TEMPERATURE OR MORE | HEAT TRANSFERRED WHEN LOW TEMPERATURE PORTION IS AT PREDETERMINED TEMPERATURE OR MORE |
| LIQUID FLOW PATH | HEAT TRANSFERRED WHEN HIGH TEMPERATURE PORTION IS AT TEMPERATURE LESS THAN PREDETERMINED TEMPERATURE | HEAT TRANSFERRED WHEN LOW TEMPERATURE PORTION IS AT TEMPERATURE LESS THAN PREDETERMINED TEMPERATURE |

U.S. PATENT DOCUMENTS

| | | | | |
|---|---|---|---|---|
| 3,965,970 A | * | 6/1976 | Chisholm | 165/274 |
| 4,137,964 A | * | 2/1979 | Buckley | 165/272 |
| 4,993,628 A | * | 2/1991 | Reynolds | 236/34.5 |
| 6,268,077 B1 | | 7/2001 | Kelley et al. | |
| 2004/0062961 A1 | | 4/2004 | Sato et al. | |

FOREIGN PATENT DOCUMENTS

| | | |
|---|---|---|
| JP | 7-332881 A | 12/1995 |
| JP | 10-064567 A | 3/1998 |
| JP | 11-351679 A | 12/1999 |
| JP | 2000-353536 A | 12/2000 |
| JP | 2003-148882 A | 5/2003 |
| JP | 2004-031096 A | 1/2004 |
| JP | 2004-127625 A | 4/2004 |
| JP | 2005-011123 A | 1/2005 |
| WO | 2004-106822 A1 | 12/2004 |

OTHER PUBLICATIONS

Tohru Saitoh et al., "Manipulate Fluid in Microchannels with Thermo-responsive FilmAnalytica Chimica," 536 Acta 179-82 (Feb. 2005).

* cited by examiner

FIG. 3

|  | HIGH TEMPERATURE PORTION | LOW TEMPERATURE PORTION |
|---|---|---|
| VAPOR FLOW PATH | HEAT TRANSFERRED WHEN HIGH TEMPERATURE PORTION IS AT PREDETERMINED TEMPERATURE OR MORE | HEAT TRANSFERRED WHEN LOW TEMPERATURE PORTION IS AT PREDETERMINED TEMPERATURE OR MORE |
| LIQUID FLOW PATH | HEAT TRANSFERRED WHEN HIGH TEMPERATURE PORTION IS AT TEMPERATURE LESS THAN PREDETERMINED TEMPERATURE | HEAT TRANSFERRED WHEN LOW TEMPERATURE PORTION IS AT TEMPERATURE LESS THAN PREDETERMINED TEMPERATURE |

FIG. 4

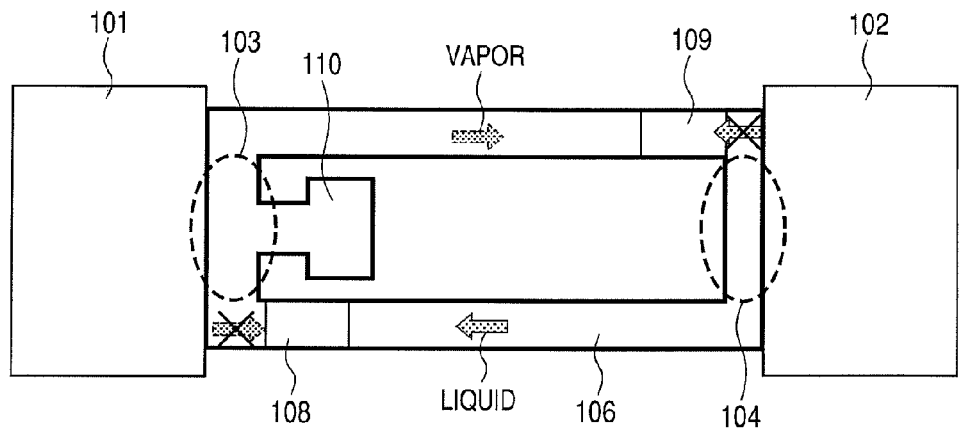

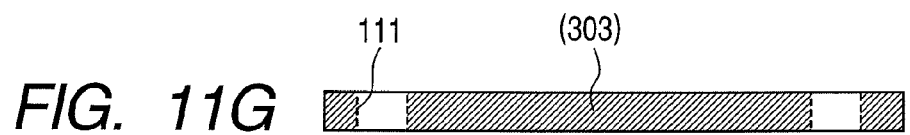
FIG. 11G
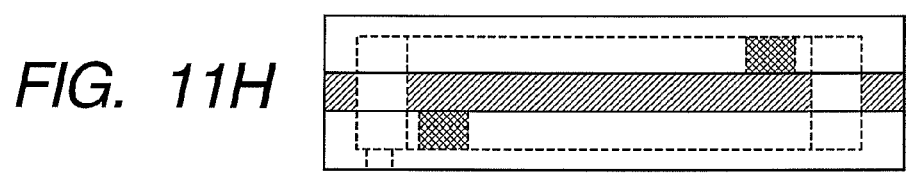
FIG. 11H
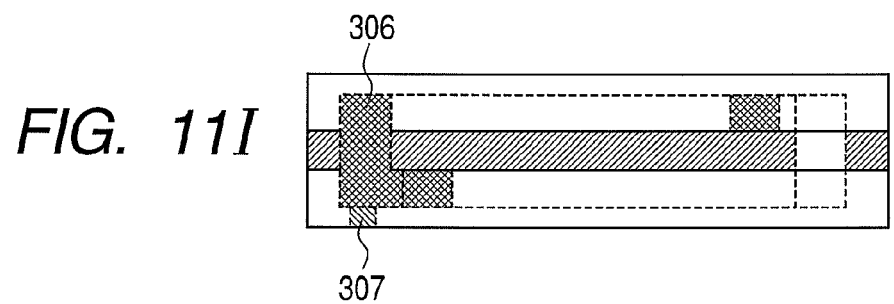
FIG. 11I
FIG. 12
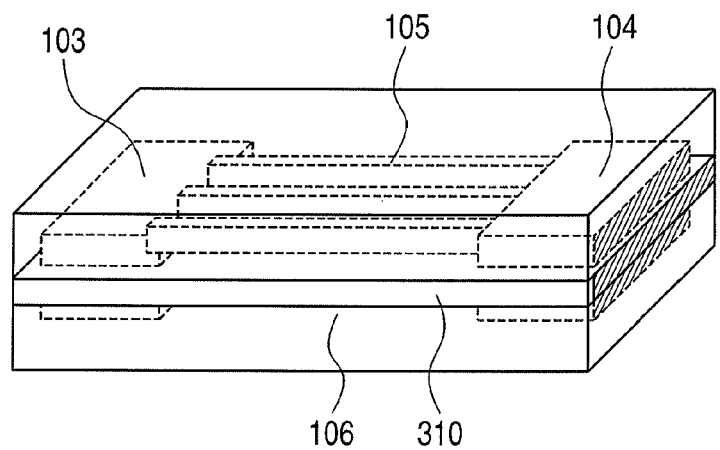

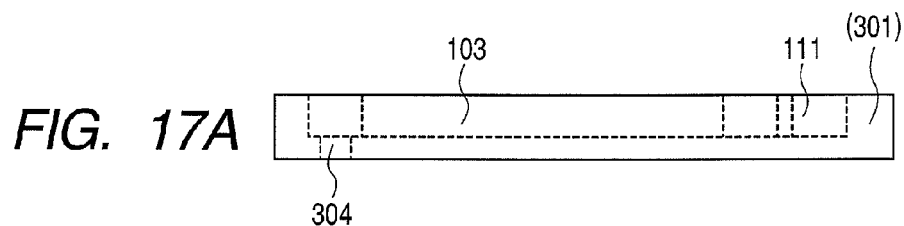
FIG. 17A
FIG. 17B
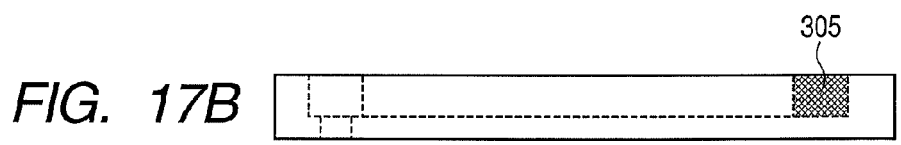
FIG. 17C
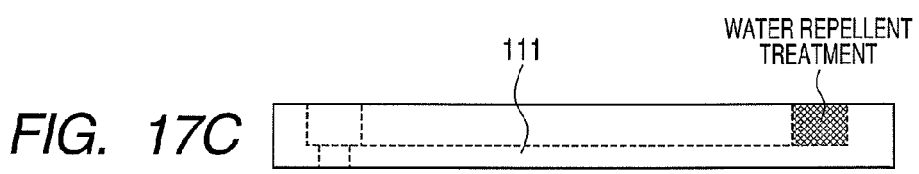
FIG. 17D
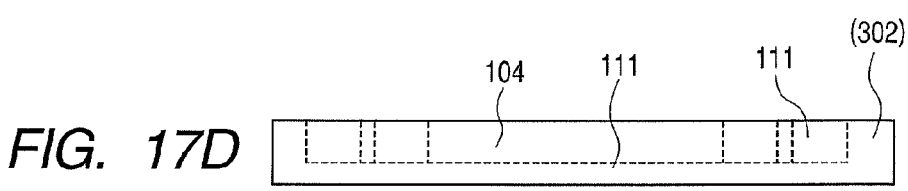
FIG. 17E
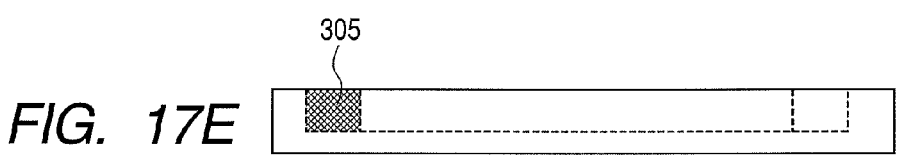
FIG. 17F
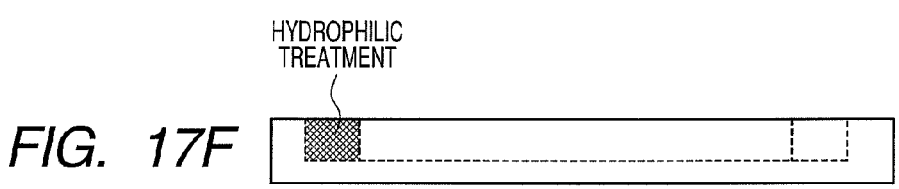

FIG. 20

| TEMPERATURE [°C] | 18 | 20 | 25 | 50 |
|---|---|---|---|---|
| RELEASE RATE [%/s] | 0.05 | 0.1 | 0.2 | 2 |
| RELEASE RATE [mol/s] (TANK VOLUME: 5.15cm$^3$: 2.8x2.3x0.8cm) | 0.0038 | 0.008 | 0.015 | ENTIRE AMOUNT |

FIG. 21

| TEMPERATURE [°C] | 20 | 25 | 50 | 100 |
|---|---|---|---|---|
| DISSOCIATION PRESSURE [atm] | 1.5 | 2 | 4 | 20 |

HEAT TRANSFER CONTROLLING MECHANISM AND FUEL CELL SYSTEM HAVING THE HEAT TRANSFER CONTROLLING MECHANISM

TECHNICAL FIELD

The present invention relates to a heat transfer controlling mechanism and a fuel cell system having the heat transfer controlling mechanism mounted thereon. More particularly, it relates to a heat transfer controlling mechanism including a loop heat pipe for allowing a working fluid to flow in a predetermined direction and for controlling the heat transfer amount thereof according to circumstances.

BACKGROUND ART

A heat pipe has been known as a mechanism in which a working fluid is sealed within a closed space and highly efficient heat transfer is performed by using the vaporization and condensation thereof.

In the heat pipe, a working fluid, which has received heat, is vaporized at a vaporizing portion, moves within a tubular path, and is then cooled at a condensing portion to thereby return to a liquid state. The condensed working fluid is again transported to the vaporizing portion (reflux or reflow).

There are many cases where the heat transport efficiency of a heat pipe is determined by the rate of the reflux. Therefore, in order to accelerate the reflux, there have been performed an attempt in which the flow path is directed downward to utilize gravity and an attempt in which a wick is provided to utilize a capillary force.

Among such attempts, heat pipes of a type in which working fluid is circulated within a loop-shaped closed space are called loop heat pipes. These pipes have been studied mainly for cosmic purposes. These heat pipes are called CPL (Capillary Pumped Loop), LHP (Loop Heat pipe), and the like.

The loop heat pipe includes a vaporizer, a condenser, a reserver, a loop pipe connecting these elements, and a working fluid for circulating within the pipe.

In the loop heat pipe, since there is no necessity to allow a flow path to be directed downward for hastening the reflux, the limitation of orientation thereof is relaxed as compared to a linear heat pipe using a linear pipe. Moreover, the degree of freedom of the shape thereof can be improved.

In such a loop heat pipe, it is important to allow a working fluid to flow in a predetermined direction without a back flow in a loop flow path.

For this reason, in Japanese Patent Application Laid-Open No. H07-332881, there are provided a forced circulation flow generating means (electromagnetic pump or the like) for preventing the back flow and a flow rate adjusting means (flow rate adjusting valve) for adjusting the circulation flow rate of a working fluid.

Moreover, in Japanese Patent Application Laid-Open No. 2003-148882, there is adopted a configuration in which a fluid reservoir portion for preventing the back flow of vapor is provided so that a working fluid is caused to flow in a predetermined direction.

As a method of storing a fluid within the fluid reservoir portion, there are proposed a method in which there is provided, within a flow path, a valve of a shape memory alloy such that when vapor comes into contact with a valve, the valve is heated and closed to prevent the back flow, and a method in which there is provided a filter to absorb condensed fluid by a capillary force.

Moreover, when an attempt is made to reduce the size of a heat pipe, as the size becomes smaller, the influence of a frictional force or surface tension of a pipe path becomes larger than the influence of gravity.

Namely, it is more advantageous to utilize the capillary force for the reflux than gravity. For example, in D. Liepmann, Proceedings of 2001 ASME International Mechanical Engineering Congress and Exposition November 11-16, New York (2001), a micro-loop heat pipe is produced utilizing semiconductor processing technology. Further, gravity is not used for the reflux, and the acceleration of the movement of the condensed fluid is realized by means of a wick provided at a vaporizing portion.

Fuel cells of various types have been studied and developed. Among the fuel cells, a polymer electrolyte fuel cell (proton exchange membrane fuel cell) has been widely studied and developed as an automotive or residential power generator, because it has a relative low operating temperature and uses a polymer film electrolyte, which is easy to handle.

Moreover, for the purpose of carrying and using a small-sized electric device, there have been used various primary batteries and secondary batteries.

However, with the recent development of high-performance small-sized electric devices, power consumption has become large, so that sufficient energy cannot be supplied by means of a primary battery without increasing the size and weight of the devices.

Moreover, while the secondary battery can be advantageously used by being repeatedly charged, the amount of energy that it can generate from a single charge is less than that of the primary battery.

Further, another power source is required for the purpose of charging a secondary battery. In addition, it generally takes from several tens of minutes to several hours to charge a secondary battery, so that it is difficult to allow the secondary battery to be immediately used on demand.

In the future, with the increase in the tendency of carrying and using electric devices, a further reduction in their size and weight, and implementation of wireless network environments, it is difficult for conventional primary and secondary batteries to supply a sufficient amount of energy to drive such devices.

Small-sized fuel cell have attracted attention as a countermeasure for such problems. The reason why a fuel cell is useful as a drive source for a small-sized electric device is that the amount of energy that can be supplied per unit volume or per unit weight is about several times to ten times that of a conventional battery.

Further, by only supplying fuel, the fuel cell can be continuously used, which avoids the delay associated with the charging of conventional secondary batteries.

A polymer electrolyte fuel cell using hydrogen as fuel or a direct methanol fuel cell is mainly used as such a small-sized fuel cell.

In a fuel cell for obtaining a large output, it is effective to use hydrogen as fuel.

However, hydrogen is gaseous at ordinary temperature, and it has been difficult to store hydrogen at a high density in a small fuel tank.

In view of the above, when hydrogen is to be used as fuel, in order to efficiently and safely store hydrogen, there is employed a method of filling a hydrogen storage alloy in a fuel tank and allowing hydrogen to be adsorbed by the alloy. When a hydrogen storage alloy is used, the reaction of releasing hydrogen is generally an endothermic reaction. For example, $LaNi_5$ known as a hydrogen storage alloy absorbs heat of about 30 kJ when releasing 1 mole of hydrogen.

Moreover, the relationship between the temperature T of a hydrogen storage alloy and the hydrogen dissociation pressure $P_{H2}$ is expressed by the following formula called "van't Hoff's equation:

$$\ln P_{H2} = \frac{2\Delta H^0}{nR}\frac{1}{T} - \frac{2\Delta S^0}{nR}$$

wherein n is number of moles, and R is gas constant, and in $LaNi_s$, $\Delta H^0 = -30.1$ (kJ/mol $H_2$) and $\Delta S^0 = -108.8$ (kJ/mol $H_2$). As is seen from the above equation, as the hydrogen is released, the temperature of the fuel tank is lowered, and the pressure inside the tank and the hydrogen release rate are reduced.

Particularly, during power generation of a fuel cell, as hydrogen release and power generation proceed, the tank temperature decreases and the hydrogen release rate is reduced.

To the contrary, when the fuel tank is heated, the pressure inside the tank and the hydrogen release rate increase. Accordingly, in order to obtain a sufficient hydrogen release rate and to prevent the tank pressure from excessively increasing, the temperature inside the tank needs to be kept constant.

Power generation of a polymer electrolyte fuel cell is performed in a manner as described below.

As a polymer electrolyte membrane, perfluorosulfonic acid cation-exchange resin is frequently used. For example, Nafion (trade name; manufactured by DuPont Company) is well known as such a material.

A polymer electrolyte membrane is interposed between a pair of porous electrodes each carrying a catalyst, such as platinum, i.e., a fuel electrode and an oxidizer electrode constitute a membrane electrode assembly as a power generation cell.

An oxidizer is supplied to the oxidizer electrode of the fuel cell, and a fuel is supplied to the fuel electrode, so that protons move within the polymer electrolyte membrane to perform power generation.

Such a power generation reaction is most effective when performed within the temperature range of about 60° C. to about 100° C.

However, the polymer electrolyte membrane has such a property that when the temperature exceeds 100° C., the power generation performance is remarkably decreased. Moreover, although the polymer electrolyte membrane is generally used in a wet state, water in the polymer electrolyte membrane will be vaporized at a temperature of 100° C. or more.

Accordingly, it is not preferable for the power generation cell temperature to reach 100° C. or more during power generation.

The power generation efficiency of a polymer electrolyte fuel cell is about 50%, and heat in an amount that is approximately identical to the power generation amount is produced. Accordingly, in power generation, it is necessary to maintain fuel cell units at a suitable temperature.

In view of the above, in Japanese Patent Application Laid-Open No. 2004-31096, there is proposed a fuel cell in which heat produced by the power generation cell is radiated by using a fuel tank casing.

In this fuel cell, in order to prevent the temperature of the fuel tank from being excessively raised by the heat from the power generation cell, the casing and inside of the tank are separated by a heat insulating member.

Moreover, Japanese Patent Application Laid-Open No. H06-260202 discloses a method in which a heat exchange between a fuel cell unit and a fuel tank is performed by using cooling water. Also, Japanese Patent Application Laid-Open No. H10-064567 discloses a method in which a heat exchange between a fuel cell unit and a fuel tank is performed by using exhaust gas.

Further, as a method of efficiently performing a heat exchange directly between a fuel cell unit and a fuel tank without using a medium such as cooling water or exhaust gas, U.S. Pat. No. 6,268,077 discloses a fuel cell system as described below.

In this patent, there is disclosed a fuel cell system, which includes a fuel cell having power generation cells disposed in a planar form and a fuel tank, wherein a principal surface of the fuel cell and a principal surface of the fuel tank are in contact with each other.

Moreover, Japanese Patent Application Laid-Open No. 2000-353536 proposes a fuel cell using a heat pipe for radiation. In this fuel cell, for attaining a reflux in which a condensed working fluid is again transported to a vaporizing portion, there is employed a system in which a flow path using a linear heat pipe is directed downward to utilize a gravity.

Moreover, the theoretical voltage of one membrane electrode assembly set is about 1.23V, and there are many cases where the assembly is used at about 0.7 V in an ordinary operating state.

For this reason, when a higher voltage is required, or when a high output density is required, there is used a stack structure in which a plurality of fuel cell units are stacked to electrically connect the respective fuel cell units in series.

Such a stack structure is called a fuel cell stack. Generally, an anode flow path and a cathode flow path in the stack are separated by a member called a separator.

Generally, in the fuel cell stack, there is a tendency in that as a cell is positioned closer to the central part, its radiation efficiency becomes poor and its temperature becomes high, and as a cell is positioned closer to the end part, its temperature becomes low.

When a temperature difference is generated between the cells in the stack, a variance in power generation performance is caused depending on the power generation cell units, which is not preferable.

In view of the above, in Japanese Patent Application Laid-Open No. 2004-31096 mentioned above, there is employed a method in which a member having a high thermal conductivity is used as a member constituting a fuel cell (stack) to thereby prevent heat from residing in the vicinity of the central part of the stack to thereby reduce a temperature difference between fuel cell units.

However, the above-mentioned conventional examples of the loop heat pipe have problems as described below.

For example, the loop heat pipe disclosed in Japanese Patent Application Laid-Open No. H07-332881 is provided with the pump for preventing back flow.

However, when such a fluid machine is provided, the system becomes complicated and large, and the power consumption is increased, which results in disadvantages in achieving a reduction of the size of the system.

Moreover, when the valve made of a shape memory alloy or the fluid reservoir using a filter for absorbing condensed fluid by a capillary force is used as disclosed in Japanese Patent Application Laid-Open No. 2003-148882, the back flow of vapor can be prevented without using electric power.

However, because gravity is utilized to reflux the condensed fluid, there is a possibility that if the heat pipe is reduced in size so that the influence of a frictional force becomes large, or if the heat pipe is incorporated into a device the vertical direction of which is not determined, the heat pipe would not effectively operate.

Further, the valve made of a shape memory alloy is provided in a flow path of the heat pipe. However, this valve is opened/closed by the temperature of working vapor and cannot be controlled according to the temperature conditions of the outside of the pipe.

Furthermore, in the micro-pipe of D. Liepmann, Proceedings of 2001 ASME International Mechanical Engineering Congress and Exposition November 11-16, New York (2001), no gravity is used for refluxing. The movement of the condensed fluid can be accelerated by using wicks provided at a vaporizing portion. However, a mechanism for preventing the back flow is not incorporated. In addition, the quantity of transported heat cannot be controlled.

Further, the above-mentioned examples of the conventional fuel cell system have problems as described below. For example, the fuel cell of Japanese Patent Application Laid-Open No. 2004-31096 can prevent the temperature elevation of the fuel cell, but does not effectively function with respect to lowering the temperature inside the fuel tank.

Furthermore, since a heat transfer is performed mainly by heat conduction in a solid, when a large amount of heat is generated, or when the heat transport distance is large, there is a possibility that the ability to transport heat may become insufficient.

Further, in the fuel cells of Japanese Patent Application Laid-Open Nos. H06-260202 and H10-064567, when heat exchange is performed between the fuel cell unit and the fuel tank, a circulating device for cooling water or exhaust gas is required, which may result in a size increase of the system and a decrease in the energy utilization efficiency of the entire system.

The fuel cell disclosed in U.S. Pat. No. 6,268,077 does not require a special system for heat exchange, but the heat exchange amount is determined by the area of the fuel cell principal surface so that it is difficult to optimally control the heat exchange quantity depending on the temperature.

In addition, in Japanese Patent Application Laid-Open No. 2000-353536, for attaining reflux in which a condensed working fluid is again transported to a vaporizing portion, there is employed a system in which a flow path using a linear heat pipe is directed downward to utilize gravity.

Accordingly, when such a linear heat pipe utilizing gravity while being directed downward is used for a fuel cell the vertical direction of which at the time of use is not determined, there is a possibility that the heat pipe may not effectively operate.

DISCLOSURE OF THE INVENTION

The present invention is directed to a heat transfer controlling mechanism that permits a working fluid to flow in a predetermined direction in a loop-shaped flow path without causing a back flow using a simple structure, which is not restricted to the orientation in a use state, and which has low power consumption and can realize efficient heat transfer and size reduction.

Moreover, the present invention is directed to a fuel cell system, which has the heat transfer controlling mechanism of the present invention mounted thereon to thereby have the ability, in addition to the function of the heat transfer controlling mechanism, to maintain the fuel cell power generation unit and the fuel tank at suitable temperatures.

In order to solve the above-mentioned problems, the present invention provides a heat transfer controlling mechanism configured as described below and a fuel cell system having such a heat transfer controlling mechanism mounted thereon.

The heat transfer controlling mechanism of the present invention includes a vaporizing portion, a condensing portion, and a loop-shaped flow path connecting the vaporizing portion and the condensing portion such that a working fluid is sealed therein. The heat transfer controlling mechanism transports heat by vaporizing the working fluid in the vaporizing portion and condensing the working fluid in the condensing portion to thereby control heat transfer. The heat transfer controlling mechanism further includes a gas passage suppressing portion provided on one side in the loop-shape flow path, for allowing a liquid to pass therethrough and preventing the passage of a gas, and a liquid passage suppressing portion provided on the other side in the loop-shaped flow path, for allowing a gas to pass therethrough and preventing the passage of a liquid.

Further, the heat transfer controlling mechanism of the present invention is characterized in that the gas passage suppressing portion is formed of a hydrophilic member provided in a surface of the flow path.

Moreover, the heat transfer controlling mechanism of the present invention is characterized in that the liquid passage suppressing portion is formed of a hydrophobic member provided in a surface of the flow path.

Further, the heat transfer controlling mechanism of the present invention is characterized in that at least one of the gas passage suppressing portion and the liquid passage suppressing portion comprises a wettability changing portion comprising a material with a contact angle that changes at a predetermined temperature.

Moreover, the heat transfer controlling mechanism of the present invention is characterized in that the wettability changing portion includes a material that changes from being hydrophilic to being hydrophobic at a predetermined temperature or more.

Further, the heat transfer controlling mechanism of the present invention is characterized by including a heat transfer controlling member adjacent to at least one of the vaporizing portion and the condensing portion, for changing the amount of heat transported by the actions of vaporizing and condensing the working fluid depending on a temperature state of the vaporizing portion or the condensing portion.

Moreover, the heat transfer controlling mechanism of the present invention is characterized in that the heat transfer controlling member is provided adjacent to the vaporizing portion or the condensing portion and changes a flow path resistance of the loop-shaped flow path depending on the temperature of the vaporizing portion or the condensing portion.

Further, the heat transfer controlling mechanism of the present invention is characterized in that the heat transfer controlling member is formed of a bimetal or a shape memory alloy.

Moreover, the heat transfer controlling mechanism of the present invention is characterized in that the heat transfer controlling member is formed of a material, which undergoes a phase transition depending on the temperature to change its volume.

In addition, the fuel cell system of the present invention includes a fuel tank, a fuel cell unit for performing power generation using fuel supplied from the fuel tank, and the above-mentioned heat transfer controlling mechanism provided between the fuel tank and the fuel cell unit. The condensing portion is disposed on the fuel tank side. The vaporizing portion is disposed on the fuel cell unit side.

Furthermore, the fuel cell system of the present invention includes a fuel tank, a fuel cell unit for performing power generation using fuel supplied from the fuel tank and the above-mentioned heat transfer controlling mechanism provided between the fuel tank and the fuel cell unit. The fuel cell unit and a radiating plate with an air hole for supplying air are connected through a wettability changing portion with a contact angle that changes at a predetermined temperature or through a heat transfer member having a thermal junction, which operates at a predetermined temperature or more. The thermal junction includes a heat transfer controlling member in the heat transfer controlling mechanism.

Moreover, the fuel cell system of the present invention is characterized by further including a water flow path for guiding water produced by power generation in the fuel cell unit to the radiating plate.

Further, the fuel system of the present invention is characterized in that a pattern including a hydrophilic portion and a hydrophobic portion is formed on a surface of the water flow path.

Moreover, the fuel cell system of the present invention is characterized in that a water absorbing member is provided on a surface of the radiating plate.

Further, the fuel cell system of the present invention is characterized in that the water absorbing member includes a member having an air permeation rate that increases with the increase in the amount of absorbed water.

Still further, the fuel cell system of the present invention includes a heat spreader for making uniform a variance of heat produced by power generation in a fuel cell unit. The heat spreader includes the above-mentioned heat transfer controlling mechanism.

Moreover, the fuel cell system of the present invention is characterized in that the heat spreader also serves as at least one of the above-mentioned heat transfer controlling mechanisms provided between the fuel cell unit and the fuel tank and the above-mentioned heat spreader.

According to the present invention, it is possible to realize a heat transfer controlling mechanism, which allows a working fluid to flow in a predetermined direction in a loop-shaped flow path without causing back flow with a simple structure. There is no restriction on the orientation of this mechanism during use. This mechanism has low power consumption and can provide an efficient heat transfer and size reduction. Further, by mounting the heat transfer controlling mechanism of the present invention, a fuel cell system can be realized, which, in addition to the functions of the heat transfer controlling mechanism, can maintain the fuel cell power generation unit and the fuel tank at suitable temperatures.

Further features of the present invention will become apparent from the following description of exemplary embodiments with reference to the attached drawings.

BRIEF DESCRIPTION OF THE DRAWING

FIG. 3 is a table collectively illustrating the case where the position of the wettability changing portion of the loop heat pipe of Embodiment 1 of the present invention is changed;

FIG. 4 is a diagram illustrating a configuration example in which a reservoir of the loop heat pipe of Embodiment 1 of the present invention is provided;

FIGS. 8A and 8B are diagrams respectively illustrating a configuration example of a member displaced depending on the temperature of the loop heat pipe of Embodiment 2 of the present invention, wherein FIG. 8A illustrates a configuration including a bimetal 202 and FIG. 8B illustrates a configuration in which a member (phase transition member) 204 is deformed by the volume change thereof due to the phase transition (liquefaction or vaporization) depending on the temperature of the loop heat pipe;

FIGS. 11A, 11B, 11C, 11D, 11E, 11F, 11G, 11H, and 11I are views illustrating a production method of a loop heat pipe of Example 2 of the present invention;

FIG. 12 is a perspective view of the loop heat pipe of Example 2;

FIGS. 17A, 17B, 17C, 17D, 17E, 17F, 17G, 17H, 17I, 17J, and 17K are views illustrating a production method of a loop heat pipe of Example 5 of the present invention;

FIG. 20 is a diagram illustrating the relationship between the temperature of a fuel tank filled with $LaNI_5$ of the fuel cell system of Example 6 of the present invention and hydrogen release rate;

FIG. 21 is a diagram illustrating the relationship between the temperature of a fuel tank filled with $LaHI_5$ of the fuel cell system of Example 6 of the present invention and hydrogen dissociation pressure;

BEST MODES FOR CARRYING OUT THE INVENTION

Embodiments of the present invention will now be described.

In this embodiment, as a heat transfer controlling mechanism, a loop heat pipe is constructed as described below.

Namely, the loop heat pipe of this embodiment includes a vaporizing portion, a condensing portion, and a loop-shaped flow path connecting the vaporizing portion and the condensing portion, a working fluid being sealed in the loop-shaped flow path. Heat transfer is performed by vaporizing the working fluid at the vaporizing portion and by condensing the working fluid at the condensing portion. Further, the flow path has a gas passage suppressing portion provided on one side thereof, for allowing a liquid to pass therethrough and preventing the passage of a gas, and a liquid passage suppressing portion provided on the other side thereof, for allowing a gas to pass therethrough and preventing the passage of a liquid.

In this instance, there may be employed a configuration including a heat transfer controlling member for changing the heat transport amount of the heat pipe depending on the temperature state of at least one of the vaporizing portion and the condensing portion.

According to the above-described configuration, the working fluid can be flown in the loop-shaped flow path in a predetermined direction without causing back flow using a simple configuration.

In addition, the circulation flow rate within the loop-shaped flow path of the working fluid can be controlled depending on the temperature of the vaporizing portion or the condensing portion by means of the heat transfer controlling member. Particularly, passive control that hardly uses electric power or the like can be performed.

Based on configuration examples of Embodiments 1 and 2, further detailed configuration of the loop heat pipe will now be described.

Embodiment 1

The configuration of a loop heat pipe of Embodiment 1 of the present invention will be described.

Figure 1:
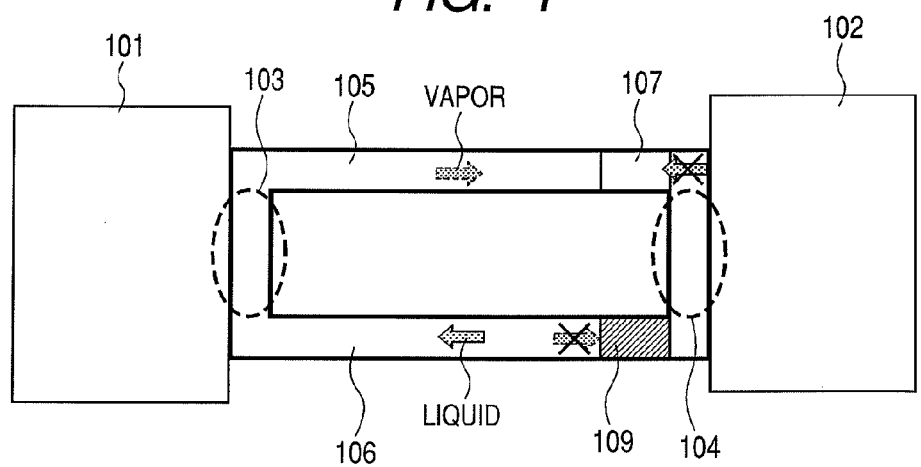
FIG. 1 is a diagram illustrating the configuration of a loop heat pipe according to Embodiment 1 of the present invention.

FIG. 1 is a schematic diagram illustrating the configuration of the loop heat pipe of Embodiment 1. In FIG. 1, reference numeral 101 denotes a high temperature portion, 102 a low temperature portion, 103 a vaporizing portion, 104 a condensing portion, 105 a vapor flow path, 106 a liquid flow path, 107 a hydrophobic portion, and 109 a wettability changing portion. In the loop heat pipe of this embodiment, the vaporizing portion 103 is provided in contact with the high temperature portion 101, the condensing portion 104 is provided in contact with the low temperature portion, and a loop-shaped flow path is provided between the vaporizing portion 103 and the condensing portion 104.

One side of the loop-shaped flow path is the vapor flow path 105, and the other side thereof is the liquid flow path 106. The vapor flow path 105 is provided with a portion, which permits the passage of a gas, but prevents the passage of a liquid. Such a portion is constituted by making the surface of a porous flow path or a small width flow path hydrophobic (hydrophobic portion 107).

Moreover, in the vicinity of the low temperature portion 102 in the liquid flow path 106, there is provided a portion, which, when the temperature is less than a predetermined temperature, exhibits hydrophilicity to permit the passage of a liquid, but prevents the passage of a gas. When the temperature is the predetermined temperature or more, this portions exhibits hydrophobicity to permit the passage of a gas but prevent the passage of a liquid.

Such a portion is constituted by, for example, providing in the liquid flow path a member having a contact angle that increases (or which becomes hydrophobic) when the temperature exceeds a predetermined temperature (wettability changing portion 109).

Specifically, the wettability changing portion is a porous flow path or a small width flow path. Further, the wettability changing portion 109 can be formed by modifying the surface of the flow path by PNIPAAm (poly-N-isopropylacrylamide), or PNIPAAm-ODS (octadodecylsilane) formed on glass.

Materials as described below are know to change their properties between hydrophilicity and hydrophobicity depending on the temperature.

For example, such materials are disclosed in T. Saitoh et al., Analytica Chimica Acta, 536, pp. 179-182 (2005). In this document, it is shown that the contact angle is about 30° in the vicinity of 25° C. in PNIPAAm (poly N-isopropylacrylamide) formed on frosted glass, or PNIPAAm-ODS (octadodecylsilane. The contact angle changes to 60° to 70° at 40° C.

In this case, a working fluid is sealed within a flow path. Although the kind of the working fluid is selected depending on the operating temperature, water is suitable at or near ordinary temperature.

The operation of the loop heat pipe in this embodiment will now be described.

First, when the temperature of the high temperature portion is elevated by the generation of heat, a working fluid is vaporized at the vaporizing portion 103. The vaporized working fluid passes through the hydrophobic portion 107 and is condensed at the condensing portion 104 to become liquid.

The condensed working fluid cannot pass through the hydrophobic portion 107. At this time, if the temperature of the condensing portion 104 is less than a predetermined temperature (30° C. to 35° C.), the wettability changing portion 109 in the liquid flow path 106 is hydrophilic to allow the fluid to pass therethrough, so that the condensed working fluid moves in the liquid flow path 106 to return to the vaporizing portion 103. At this time, the vapor in the vaporizing portion 103 cannot pass through the wettability changing portion 109 in the liquid flow path 106 and therefore will not flow backward in the liquid flow path 106.

When the temperature of the low temperature portion reaches a predetermined temperature (30° C. to 35° C.) or more, the wettability changing portion 109 is hydrophobic to prevent the passage of a fluid, so that the condensed working fluid cannot re-flow to the liquid flow path 106, whereby the heat pipe does not transport heat.

As described above, in the heat pipe of the configuration shown in FIG. 1, when the low temperature portion is at a temperature less than a predetermined temperature, heat is transferred, while when the low temperature portion is at the predetermined temperature or more, heat becomes difficult to transfer.

Moreover, the wettability changing portion may be provided at a position different from that shown in FIG. 1.

Figure 2:
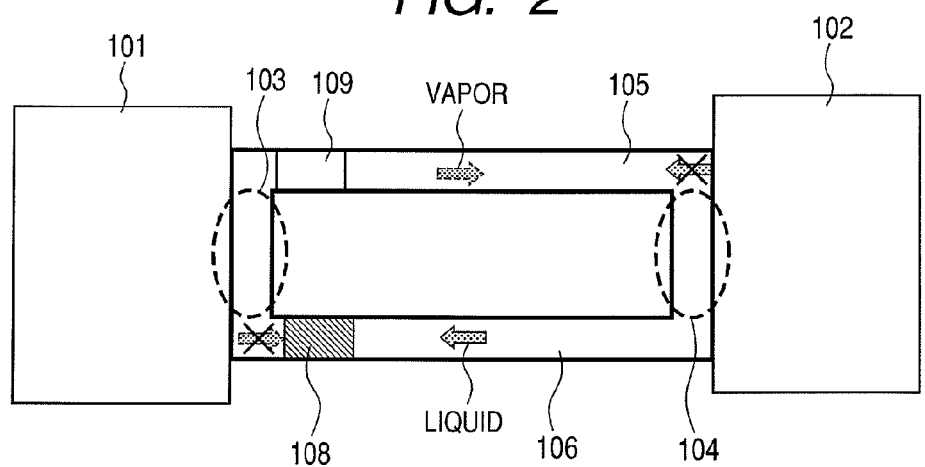
FIG. 2 is a diagram illustrating a configuration example in which the position of a wettability changing portion of the loop heat pipe of Embodiment 1 of the present invention is changed.

FIG. 2 illustrates a configuration example in which the position of the wettability changing portion 109 is changed. In FIG. 2, the wettability changing portion 109 is provided in the vapor flow path 105, and the liquid flow path 106 is provided with a portion, which permits the passage of a liquid, but prevents the passage of a gas (hydrophilic portion 108). Such hydrophilic portion 108 can be constituted by making the surface of a porous flow path or a small width flow path hydrophilic.

By adopting the configuration of the heat pipe such as illustrated in FIG. 2, when the high temperature portion is at a predetermined temperature or more, the wettability changing portion 109 becomes hydrophobic so that the gas flows to transfer heat. When the high temperature portion is at a temperature less than the predetermined temperature, the wettability changing portion 109 becomes hydrophilic so that the gas cannot flow so that heat is not transferred.

As described above, by changing the position of the wettability changing portion 109, the condition for the transfer of heat can be determined.

FIG. 3 represents a table collectively showing the cases where the position of the wettability changing portion is changed.

In FIG. 3, in the respective cases, when the flow path on the side where no wettability changing portion 109 is provided is the vapor flow path 105, the hydrophobic portion 107 is also provided thereat. When the flow path on the side with no wettability changing portion 109 is the liquid flow path 106, the hydrophilic portion 108 is also provided thereat.

Figure 5:
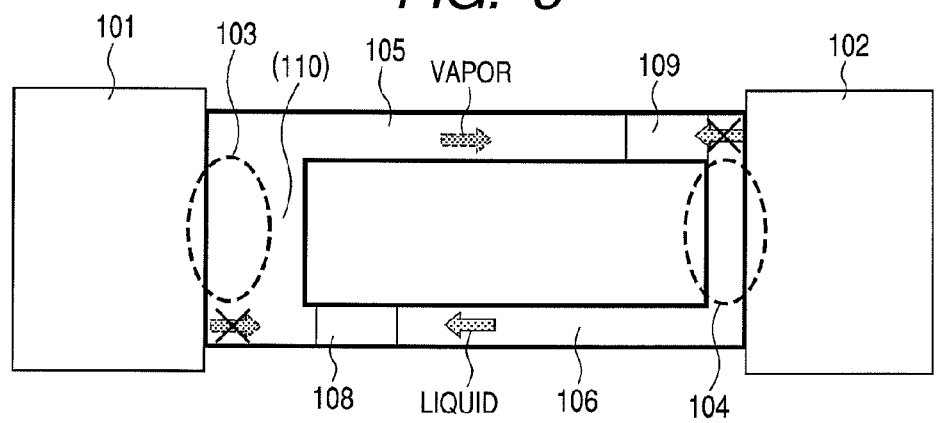
FIG. 5 is a diagram illustrating a configuration example in which the reservoir of the loop heat pipe of Embodiment 1 of the present invention is integral with a vaporizing portion.
Figure 6A:
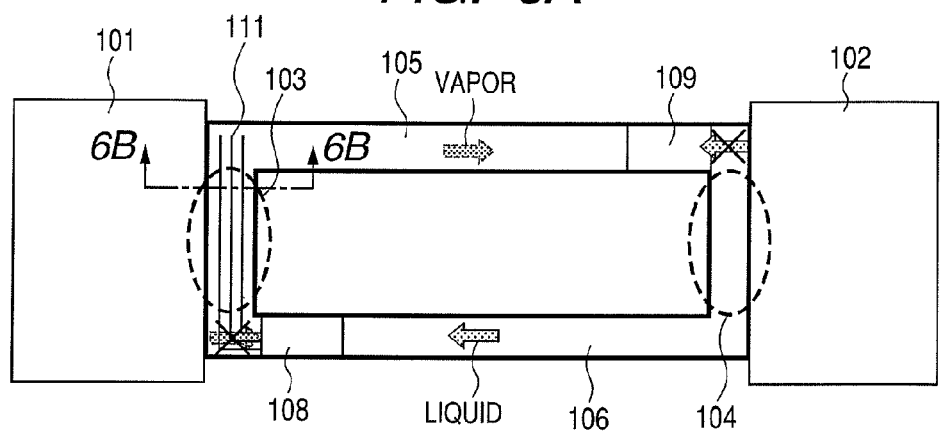
FIGS. 6A and 6B are diagrams illustrating a configuration example in which a wick is provided at the vaporizing portion and a liquid flow path of the loop heat pipe of Embodiment 1 of the present invention.
Figure 6B:
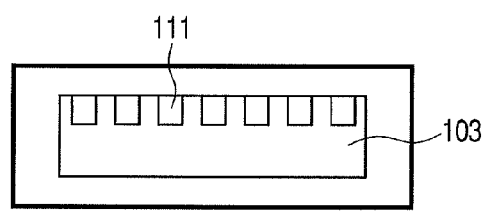

Moreover, to keep the flow rate of the working fluid at an optimum state and prevent the working fluid from being completely evaporated by heat (dry-out), a reservoir 110, such as shown in FIG. 4, may be provided. Further, as shown in FIG. 5, the reservoir 110 may be integrated with the vaporizing portion 103. Further, in order to improve the flow of the condensed working fluid, a wick 111 may be provided at the vaporizing portion 103 and the liquid flow path 106 as shown in FIG. 6, the flow path may be made porous, or the flow path may be made small in width.

In addition, the hydrophilic portion 108, the hydrophobic portion 107, and the wettability changing portion 109 may be provided either at a portion or at the entirety of each of the flow paths. Particularly, the hydrophilic portion has a capillary force and is therefore effective for accelerating the reflux.

Embodiment 2

The configuration of a loop heat pipe of Embodiment 2 of the present invention will be described.

Figure 7:
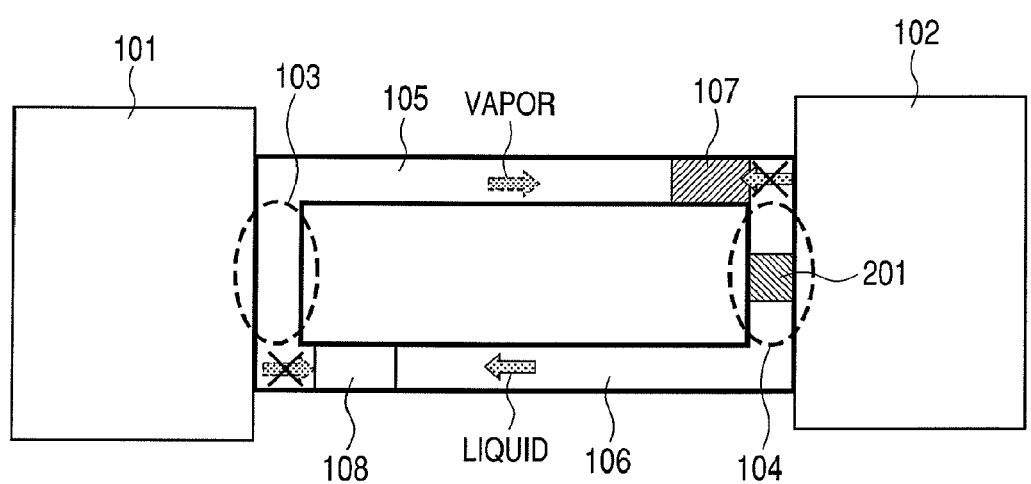
FIG. 7 is a diagram illustrating the configuration of a loop heat pipe according to Embodiment 2 of the present invention.

FIG. 7 is a schematic diagram illustrating the configuration of the loop heat pipe of Embodiment 2. In FIG. 7, the elements that are the same as those described in Embodiment 1 are identified by like numerals, so that the description of common portions will be omitted.

In FIG. 7, reference numeral 108 denotes a hydrophilic portion, and reference numeral 201 denotes a member, which is displaced depending on temperature.

In the loop heat pipe of this embodiment, a vaporizing portion 103 is provided in contact with the high temperature portion 101, a condensing portion 104 is provided in contact with the lower temperature portion 102, and a loop-shaped flow path is provided between the vaporizing portion 103 and the condensing portion 104.

One side of the loop-shaped flow path is a vapor flow path 105, and the other side is a liquid flow path 106. The vapor flow path 105 is provided with a portion through which a gas can pass but a fluid cannot pass. Such a portion is constituted by making the surface of a porous flow path or a small width flow path hydrophobic (hydrophobic portion 107).

The liquid flow path 106 is provided with a portion through which a fluid can pass but a gas cannot pass. Such a portion can be constituted by making the surface of a porous flow path or a small width flow path hydrophilic (hydrophilic portion 108).

Further, the member 201, which is displaced depending on temperature to change the flow rate of working fluid, is formed in the flow path.

Figure 8A:
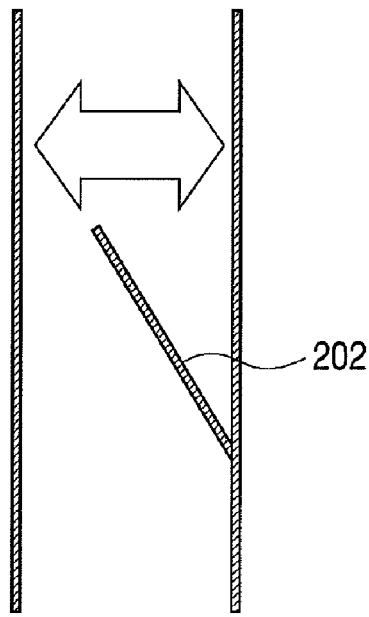

As a configuration example with such a member, there may be employed a configuration having a bimetal structure as shown in FIG. 8A, or there may be employed a configuration in which the member is made of a material having a large thermal expansion coefficient or a shape memory alloy to perform a displacement depending on temperature.

Figure 8B:
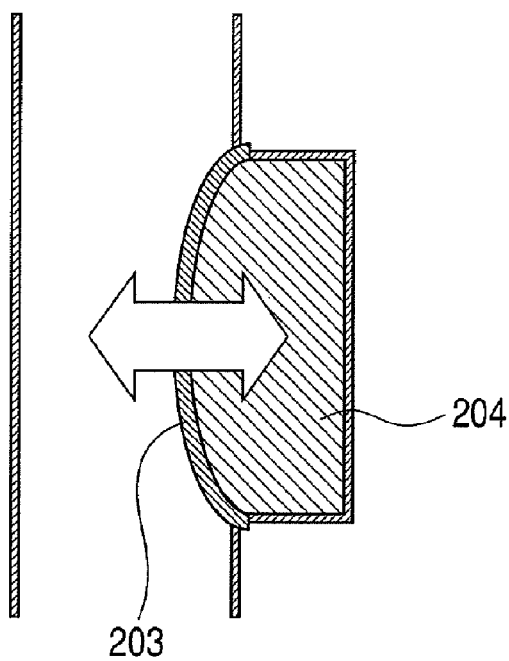

Moreover, there may be employed, as shown in FIG. 8B, a configuration in which the member is deformed by the volume change thereof due to the phase transition (liquefaction or vaporization) depending on temperature.

Further, such a displacement may be a displacement configuration to change a flow path cross section, or may be a configuration including a plurality of micro flaps to change the mode of the flow of the fluid (laminar flow, turbulent flow).

In addition, the temperature at which the displacement is performed, or whether the flow rate is to be increased or decreased when the displacement is performed, can be selected by design.

The operation of the heat pipe of this embodiment when the member 201 displaced depending on temperature is provided adjacent to the lower temperature portion will be described.

First, when the temperature of the high temperature portion is elevated by heat generation, the working fluid is vaporized at the vaporizing portion 103. The vaporized working fluid passes through the hydrophobic portion 107 and is condensed at the condensing portion 104 to become liquid. The condensed working fluid cannot pass through the hydrophobic portion 107 and passes through the hydrophilic portion 108 in the liquid flow path to return to the vaporizing portion 103.

In this case, when the temperature reaches a set temperature, the member 201, which is displaced according to temperature to change the flow rate of the working fluid, is brought into a closed state. Thus, the working fluid cannot re-flow, whereby the heat pipe stops its function.

In addition, similarly to Embodiment 1, a reservoir may be provided to prevent dry out, or reflux may be accelerated by providing a wick.

EXAMPLES

Examples of the present invention will now be described.

Example 1

In Example 1, a first production method of a loop heat pipe of Embodiment 1 will be described.

Although in this example description will be made by taking as an example a case where the semiconductor processing technology is mainly used, the heat pipe may be produced by using the mechanical processing technology, such as cutting or pressing.

FIGS. 9A to 9E are views illustrating a first production method of producing a loop-type heat pump of Embodiment 1.

In FIGS. 9A to 9E, the elements that are the same as those described in Embodiment 1 with reference to FIG. 1 are identified by like numerals, so that the description of common portions will be omitted.

In FIGS. 9A to 9E, reference numeral 301 denotes a substrate-1, 302 a substrate-2, 304 an injection port, 305 a porous portion, 306 a working fluid, and 307 a sealing agent.

Figure 9A:
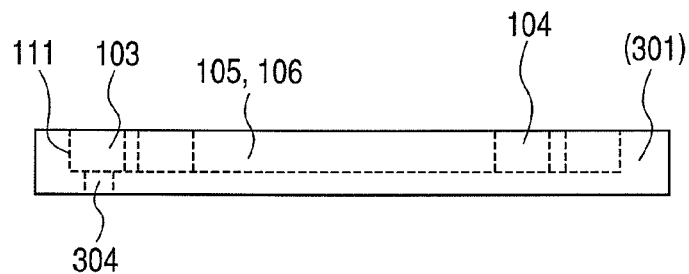
FIGS. 9A, 9B, 9C, 9D, and 9E are views illustrating a first production method of producing the loop heat pipe of Embodiment 1 in Example 1 of the present invention.

In the production method of the loop heat pipe of this example, FIG. 9A shows a step of forming flow paths 105, 106 in the substrate-1 (301).

As the substrate, a silicon wafer may be used. The thickness of the silicon wafer is, e.g., 525 μm. Although when ICP-RIE is used in an etching step, there is no restriction on the plane orientation, but when anisotropic wet etching is used, it is desirable to use a silicon wafer having a (100) plane as the surface.

Moreover, when anodization is used for making porous a portion of the flow path in a subsequent step, p-type silicon is used as the substrate.

A photoresist is coated and patterning is then performed by photolithography. With the patterned photoresist as a mask, flow paths are formed by ICP-RIE or anisotropic wet etching.

The etching depth is about 300 μm. At this time, a wick 111 for accelerating the reflux may be provided. Moreover, an injection port 304 for injecting the working fluid is also provided.

As the etching, patterning may be performed onto the rear surface by using a similar method to perform the etching, or a mask of the front surface may be formed of a two-step mask and two-stage etching may be performed.

As a mask, silicon oxide or aluminum may be used instead of a photoresist having a large film thickness.

Figure 9B:
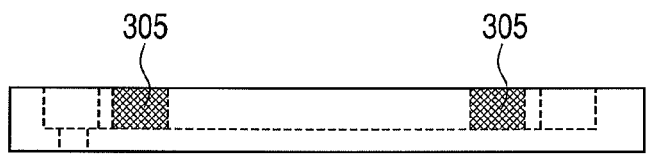

FIG. 9B illustrates a step of forming a porous portion 305.

Here, a mask is prepared in advance by use of a photoresist, and anodization in which a voltage is applied in a hydrofluoric acid solution is performed to make porous a portion of the substrate.

Moreover, instead of making a portion of the substrate porous, a fine flow path may be formed by etching.

Figure 9C:
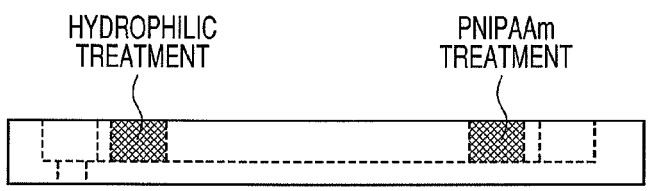

FIG. 9C illustrates a step of performing a surface treatment.

To make a surface hydrophilic, there may be used a method of oxidizing a silicon surface, a method of forming a film of titanium oxide on a surface, and the like.

A silane coupling agent or the like may be applied onto a surface to make it hydrophobic.

Moreover, by modifying a surface by PNIPAAm (poly-N-isopropylacrylamide) or PNIPAAmODS (octadodecylsilane), the wettability change at a predetermined temperature can be achieved.

Figure 9D:
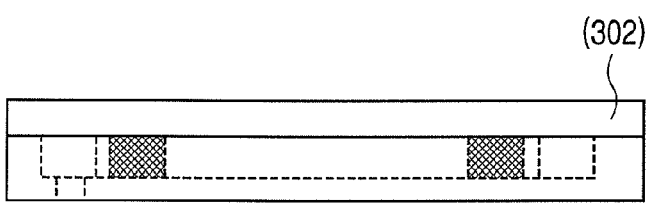

FIG. 9D illustrates a bonding step.

As the substrate-2 (302) to be bonded, a silicon wafer, a Pyrex (trade name) glass sheet or the like may be used.

In the case of a silicon wafer, diffusion bonding may be used. In the case of Pyrex (trade name) glass, anodic bonding may be used.

It is to be noted that in a case where the surface treated in the preceding surface treatment step is changed, adhesion with an adhesive may be performed.

Figure 9E:
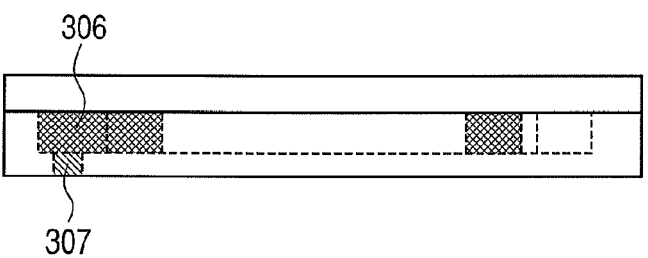

FIG. 9E illustrates a step of injecting a working fluid and sealing the working fluid.

After the working fluid is injected, sealing is performed. The injection is preferably performed in a vacuum. The sealing is performed by an adhesive or the like.

Figure 10:
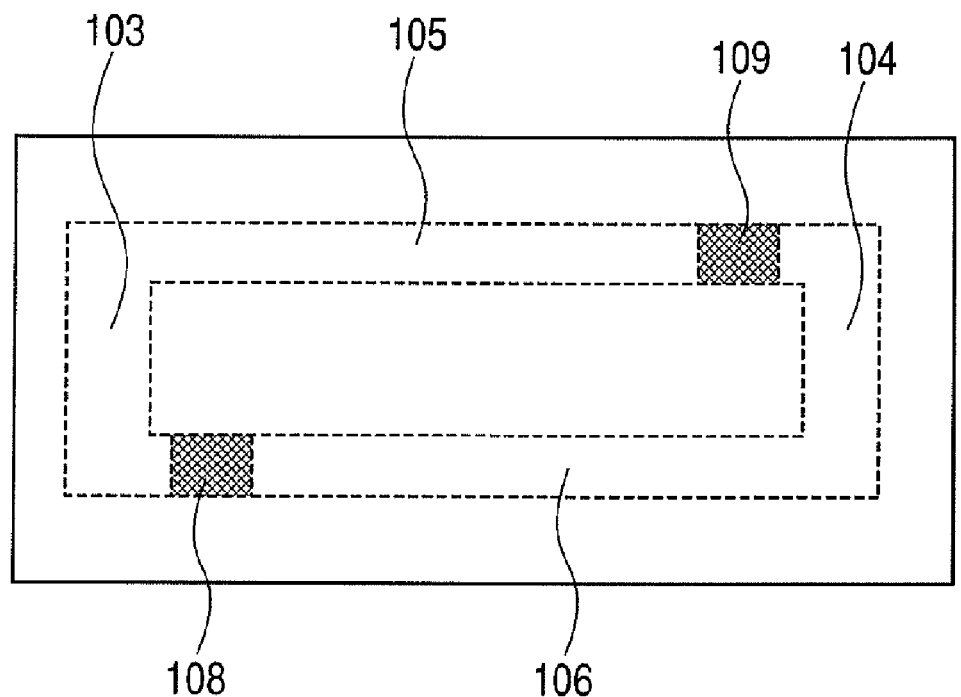
FIG. 10 is a plan view of a loop heat pipe produced by the first production method of Example 1 of the present invention.

By the above-described steps, the loop heat pipe described in Embodiment 1 can be produced. FIG. 10 is a plan view of the loop heat pipe manufactured by the above-described steps.

Example 2

In Example 2, a second production method of producing the loop heat pipe of Embodiment 1 will be described.

FIG. 12 is a perspective view of the loop heat pipe of this example. In the loop heat pipe of this example, a vapor flow path and a liquid flow path are respectively provided in different layers with a heat insulating layer 310 therebetween.

By this configuration, it is possible to widen the respective flow paths without increasing the area of the heat transfer controlling mechanism, so that the heat transfer amount can be increased.

Although this example describes a case where the semiconductor processing technology is mainly used, the heat pipe may be produced by using mechanical processing technology, such as cutting or pressing.

FIGS. 11A to 11I are views illustrating a second production method for producing the loop heat pipe of Embodiment 1. In FIGS. 11A to 11I, the elements that are the same as those described in Embodiment 1 with reference to FIGS. 9A to 9E are identified by like numerals, so that the description of common portions will be omitted.

Figure 11A:
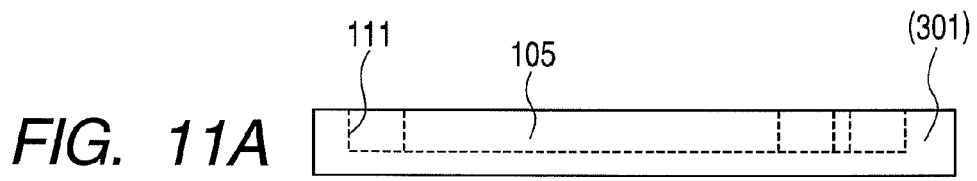

In the production method of the loop heat pipe of this example, FIG. 11A illustrates a step of forming a vapor flow path 105 in a substrate-1 (301).

As the substrate, a silicon wafer may be used. The thickness of the silicon wafer is, e.g., 525 μm. Although when ICP-RIE is used in an etching step, there is no restriction on the plane orientation, but when anisotropic wet etching is used, it is desirable to use a silicon wafer having a (100) plane as the surface.

Moreover, when anodization is used for making porous a portion of the flow path in a subsequent step, p-type silicon is used as the substrate.

A photoresist is coated and patterning is then performed by photolithography. With the patterned photoresist used as a mask, flow paths are formed by ICP-RIE or anisotropic wet etching.

The etching depth is about 300 µm. At this time, a wick 111 for accelerating the reflux may be provided. Moreover, an injection port 304 for injecting the working fluid is also provided.

As the etching, patterning may be performed onto the rear surface by using a similar method to perform etching, or a mask of the front surface may be formed of a two-step mask and two-stage etching may be performed.

As a mask, silicon oxide or aluminum may be used instead of a photoresist having a large film thickness.

Figure 11B:
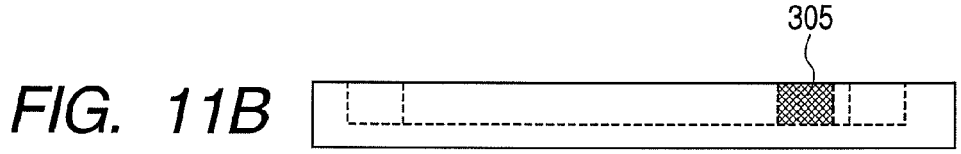

FIG. 11B illustrates a step of forming a porous portion 305.

Here, a mask is prepared in advance by use of a photoresist, and anodization in which a voltage is applied in a hydrofluoric acid solution is performed to make porous a portion of the substrate.

Moreover, instead of making a portion of the substrate porous, a fine flow path may be formed by etching.

Figure 11C:
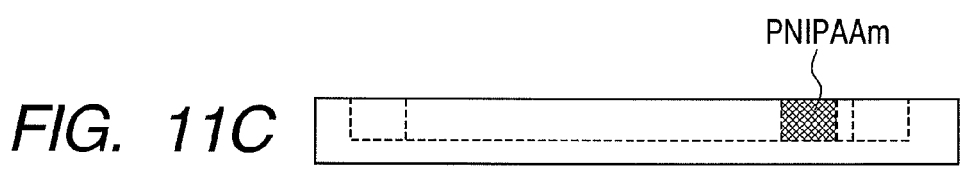

FIG. 11C illustrates a step of performing a surface treatment.

As the method of making a surface hydrophilic, there are used a method of oxidizing a silicon surface, a method of forming a film of titanium oxide on a surface, and the like.

A silane coupling agent or the like may be applied onto a surface to make it hydrophobic.

Moreover, by modifying a surface by PNIPAAm (poly-N-isopropylacrylamide) or PNIPAAmODS (octadodecylsilane), the wettability change at a predetermined temperature may be achieved.

Figure 11D:
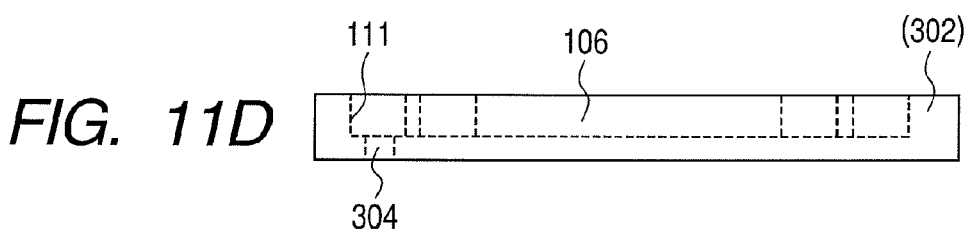

FIG. 11D illustrates a step of forming a liquid flow path 106 in a substrate-2 (302). The procedure of this step is similar to that of the first step illustrated in FIG. 11A.

Figure 11E:
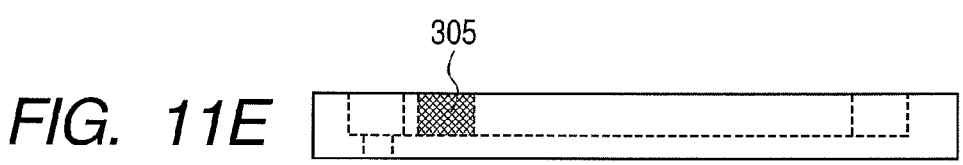

Moreover, FIG. 11E illustrates a step of forming a porous portion 305. The procedure of this step is similar to the second step of FIG. 11B.

Figure 11F:
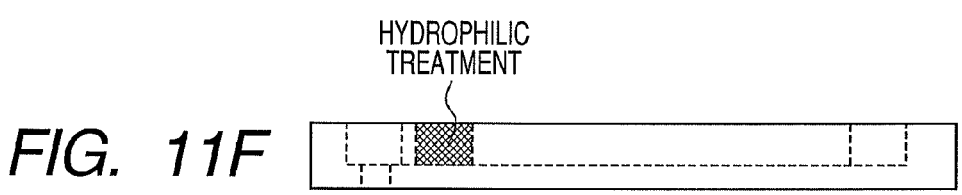

Further, FIG. 11F illustrates a step of performing a surface treatment. The procedure of this step is similar to the third step illustrated in FIG. 11C.

FIG. 11G illustrates a step of forming a vaporizing portion 103 and a condensing portion 104 in a substrate-3 (303).

As the substrate, a substrate having heat insulating property is desired. It is desirable to use a surface oxidized or nitrided silicon wafer or a glass wafer.

A substrate having both surfaces polished and having a thickness of, e.g., 525 µm may be used. When ICP-RIE is used for the etching step, there is no restriction on the plane orientation. However, when anisotropic wet etching is used, a silicon wafer having a (100) plane as the surface can be employed.

A photoresist is coated, and patterning is performed by photolithography.

With the patterned photoresist being used as a mask, in the case of a silicon wafer, a flow path is formed by ICP-RIE or anisotropic wet etching. In the case of a glass wafer, a flow path is formed by wet etching using hydrofluoric acid.

At this time, a wick 111 for accelerating the reflux may be provided.

FIG. 11H illustrates a bonding step. When the substrate-3 (303) is a silicon wafer, diffusion bonding may be used. In the case of Pyrex (trade name) glass, anodic bonding may be used.

It is to be noted that in a case where the surface treated in the preceding surface treatment step is changed, adhesion with an adhesive may be performed.

FIG. 11I illustrates a step of injecting a working fluid and sealing the working fluid. After the working fluid is injected, sealing is performed. The injection is preferably performed in a vacuum. The sealing is performed by an adhesive or the like.

By the above-described steps, the loop heat pipe described in Embodiment 1 can be produced.

Example 3

In Example 3, a third production method of producing the loop heat pipe of Embodiment 1 will be described.

Figure 14:
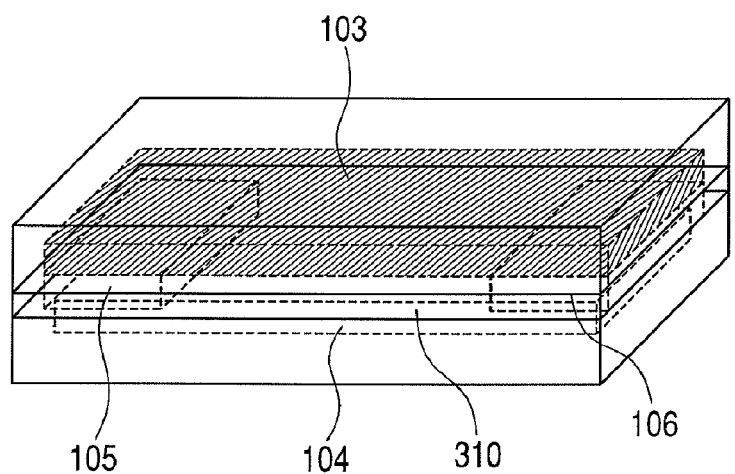
FIG. 14 is a perspective view illustrating the configuration of the loop heat pipe of Example 3 of the present invention.

FIG. 14 is a perspective view of the loop heat pipe of this example. In the loop heat pipe of this example, a vapor flow path and a liquid flow path are respectively provided in different layers with a heat insulating layer 310 being interposed therebetween.

The loop heat pipe of this embodiment is suitable when the vaporizing portion and the condensing portion each have a large area and can provide a heat transfer mechanism having a heat spreading effect for a broad surface.

Although this example describes a case where the semiconductor processing technology is mainly used, the heat pipe may be produced by using mechanical processing technology, such as cutting or pressing.

FIGS. 13A to 13I are views illustrating a third production method of producing the loop heat pipe of Embodiment 1. In FIGS. 13A to 13I, the elements that are the same as those described in Embodiment 2 with reference to FIGS. 11A to 11I are identified by like numerals, so that the description of common portions will be omitted.

Figure 13A:
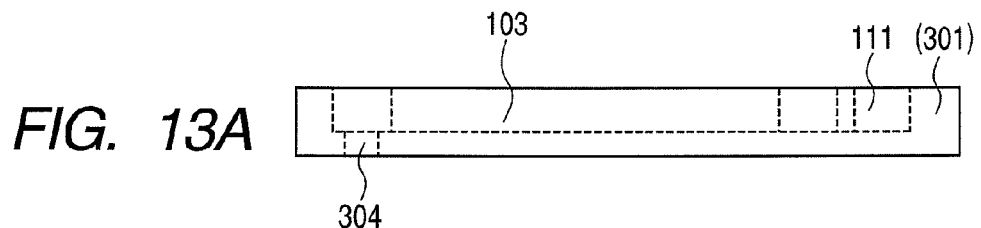
FIGS. 13A, 13B, 13C, 13D, 13E, 13F, 13G, 13H, and 13I are views illustrating a production method of a loop heat pipe of Example 3 of the present invention.
Figure 13B:
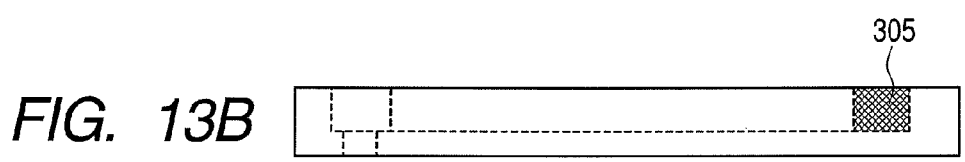
Figure 13C:
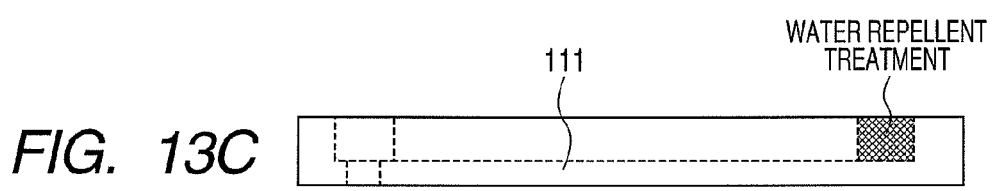
Figure 13D:
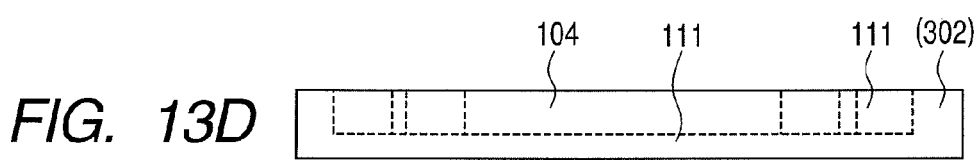
Figure 13E:
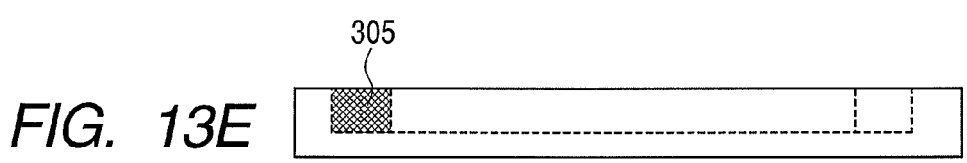
Figure 13F:
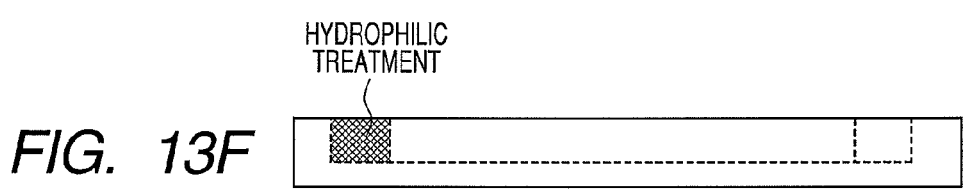
Figure 13G:
Figure 13H:
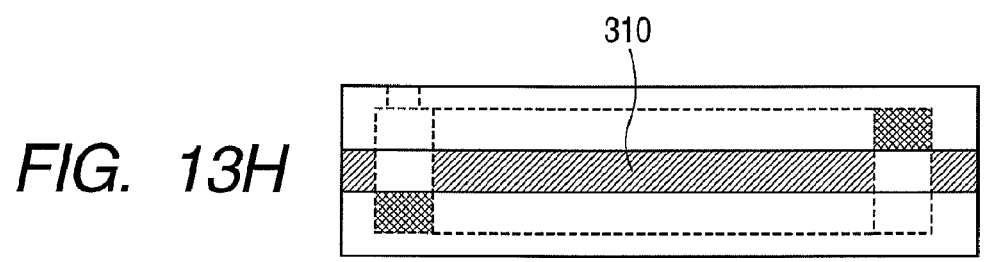
Figure 13I:
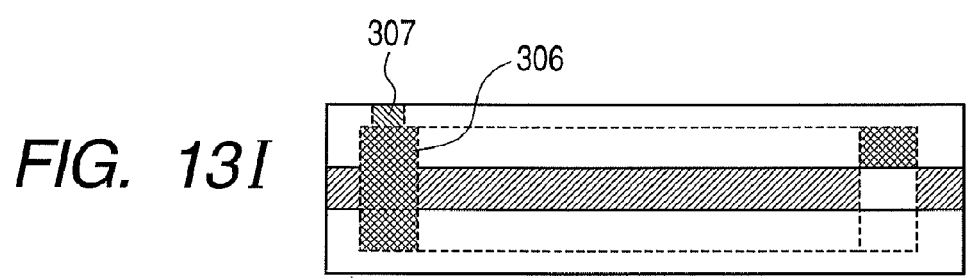

In FIGS. 13G to 13I, reference numeral 303 indicates substrate-3.

In the production method for loop heat pipe of this example, FIG. 13A illustrates a process step of forming vaporizing portion 103 on a substrate 1 (301).

As the substrate, a silicon wafer may be used. The thickness of the silicon wafer is, e.g., 525 µm. Although when ICP-RIE is used in an etching step, there is no restriction on the plane orientation, but when anisotropic wet etching is used, it is desirable to use a silicon wafer having a (100) plane as the surface.

Moreover, when anodization is used for making porous a portion of the flow path in a subsequent step, p-type silicon is used as the substrate.

A photoresist is coated and patterning is then performed by photolithography. With the patterned photoresist used as a mask, flow paths are formed by ICP-RIE or anisotropic wet etching.

The etching depth is about 300 µm. At this time, a wick 111 for accelerating the reflux may be provided. Moreover, an injection port 304 for injecting the working fluid is also provided.

As the etching, patterning may be performed onto the rear surface by using a similar method to perform etching, or a mask of the front surface may be formed of a two-step mask and two-stage etching may be performed.

Silicon oxide or aluminum may be used as a mask instead of a photoresist having a large film thickness.

FIG. 13B illustrates a step of forming a porous portion 305.

Here, a mask is prepared in advance by using a photoresist, and anodization in which a voltage is applied in a hydrofluoric acid solution is performed to make porous a portion of the substrate.

Moreover, instead of making a portion of the substrate porous, a fine flow path may be formed by etching.

FIG. 13C illustrates a step of performing a surface treatment.

As the method of making a surface hydrophilic, there are used a method of oxidizing a silicon surface, a method of forming a film of titanium oxide on a surface, and the like.

A silane coupling agent or the like may be applied onto a surface to make it hydrophobic.

Moreover, by modifying a surface by PNIPAAm (poly-N-isopropylacrylamide) or PNIPAAmODS (octadodecylsilane), the wettability change at a predetermined temperature may be achieved.

FIG. 13D illustrates a step of forming a liquid flow path 106 in a substrate-2 (302). The procedure of this step is similar to that of the first step illustrated in FIG. 13A.

Moreover, FIG. 13E illustrates a step of forming a porous portion 305. The procedure of this step is similar to the second step of FIG. 13B.

Further, FIG. 13F illustrates a step of performing a surface treatment. The procedure of this step is similar to the third step illustrated in FIG. 13C.

FIG. 13G illustrates a step of forming a vaporizing portion 103 and a condensing portion 104 in a substrate-3 (303).

As the substrate, a substrate having a heat insulating property is desired. It is desirable to use a surface oxidized or nitrided silicon wafer or a glass wafer.

A substrate having both surfaces polished and having a thickness of, e.g., 525 µm may be used. When ICP-RIE is used for the etching step, there is no restriction on the plane orientation. However, when anisotropic wet etching is used, a silicon wafer having a (100) plane as the surface can be employed.

A photoresist is coated, and patterning is performed by photolithography.

With the patterned photoresist being used as a mask, in the case of a silicon wafer, a flow path is formed by ICP-RIE or anisotropic wet etching. In the case of a glass wafer, a flow path is formed by wet etching using hydrofluoric acid.

At this time, a wick 111 for accelerating the reflux may be provided.

FIG. 13H illustrates a bonding step. When the substrate-3 (303) is a silicon wafer, diffusion bonding may be used. In the case of Pyrex (trade name) glass, anodic bonding may be used.

It is to be noted that in a case where the surface treated in the preceding surface treatment step is changed, adhesion with an adhesive may be performed.

FIG. 13I illustrates a step of injecting a working fluid and sealing the working fluid. After the working fluid is injected, sealing is performed. The injection is preferably performed in a vacuum. The sealing is performed by an adhesive or the like.

By the above-described steps, the loop heat pipe described in Embodiment 1 can be produced.

Example 4

In Example 4, a first production method of producing the loop heat pipe of Embodiment 2 will be described.

The heat transfer controlling member in this example is based on a phase transition (phase change) of a displacement member. Although this example describes a case where the semiconductor processing technology is mainly used, the heat pipe may be produced by using mechanical processing technology, such as cutting or pressing.

FIGS. 15A to 15H are views illustrating the first production method of producing the loop heat pipe of Embodiment 2 in this example.

In FIGS. 15A to 15H, the elements that are the same as those described in Example 1 are identified by like numerals, so that the description of common portions will be omitted.

In FIGS. 15A to 15H, reference numeral 203 denotes a diaphragm, and reference numeral 204 denotes a phase transition member.

Figure 15A:
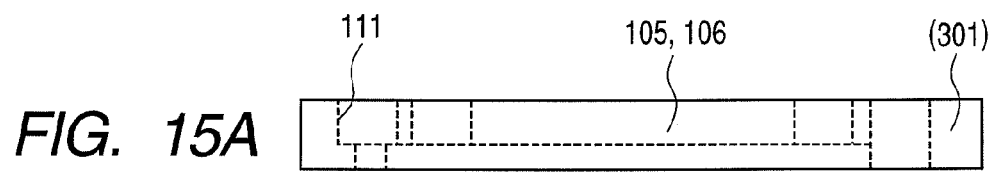
FIGS. 15A, 15B, 15C, 15D, 15E, 15F, 15G, and 15H are views illustrating a production method of a loop heat pipe of Example 4 of the present invention.

In the production method for the loop heat pipe of this example, FIG. 15A illustrates a step of forming flow paths 105, 106 in a substrate-1 (301).

As the substrate, a silicon wafer may be used. The thickness of the silicon wafer is, e.g., 525 µm. Although when ICP-RIE is used in an etching step, there is no restriction on the plane orientation, but when anisotropic wet etching is used, it is desirable to use a silicon wafer having a (100) plane as the surface.

Moreover, when anodization is used for making porous a portion of the flow path in a subsequent step, p-type silicon is used as the substrate.

A photoresist is coated, and patterning is then performed by photolithography. With the patterned photoresist used as a mask, flow paths are formed by ICP-RIE or anisotropic wet etching.

The etching depth is about 300 µm. At this time, a wick 111 for accelerating the reflux may be provided. Moreover, an injection port 304 for injecting the working fluid is also provided.

As the etching, patterning may be performed onto the rear surface by using a similar method to perform etching, or a mask of the front surface may be formed of a two-step mask and two-stage etching may be performed.

As a mask, silicon oxide or aluminum may be used instead of a photoresist having a large film thickness.

Figure 15B:
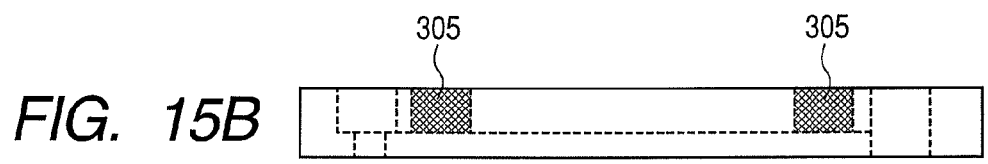

FIG. 15B illustrates a step of forming a porous portion 305.

Here, a mask is prepared in advance by using a photoresist, and anodization in which a voltage is applied in a hydrofluoric acid solution is performed to make porous a portion of the substrate.

Moreover, instead of making a portion of the substrate porous, a fine flow path may be formed by etching.

Figure 15C:
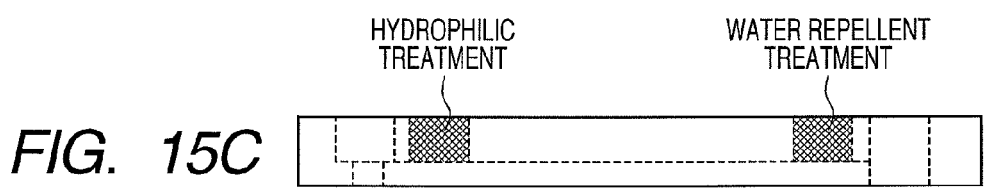

FIG. 15C illustrates a step of performing a surface treatment.

As the method of making a surface hydrophilic, there are used a method of oxidizing a silicon surface, a method of forming a film of titanium oxide on a surface, and the like.

A silane coupling agent or the like may be applied onto a surface to make it hydrophobic.

Figure 15D:
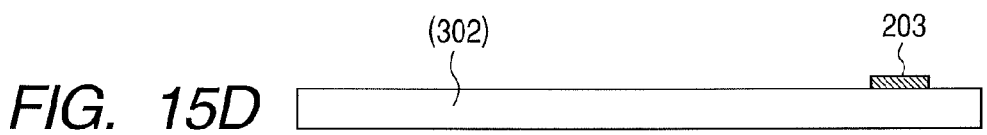

FIG. 15D illustrates a step of forming a diaphragm for displacement on a substrate-2 (302).

As the substrate 302, a silicon wafer or a glass wafer may be used. As the diaphragm, e.g., a thin film of parylene may be used. Parylene is vapor deposited on the substrate, and etching is performed by using plasma.

Figure 15E:
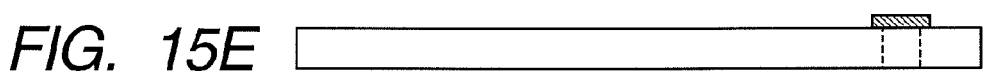

FIG. 15E illustrates a step of forming a space for injecting a phase transition member therein on the rear surface of the diaphragm.

Patterning is performed by photolithography, and the rear surface is etched.

In the case of a silicon wafer, etching may be performed by ICP-RIE or anisotropic wet etching. In the case of a glass wafer, etching may be performed by wet etching using hydrofluoric acid.

Figure 15F:
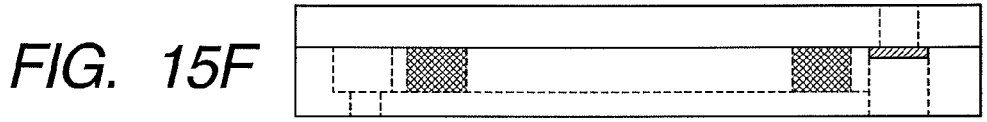

FIG. 15F illustrates a bonding step.

When the substrate-2 (302) to be bonded is a silicon wafer, diffusion bonding may be used. In the case of Pyrex (trade name) glass, anodic bonding may be used.

It is to be noted that when heat is transferred to a vaporized organic film so that the organic film is changed by a high temperature, the substrate may be adhered by an adhesive.

Figure 15G:
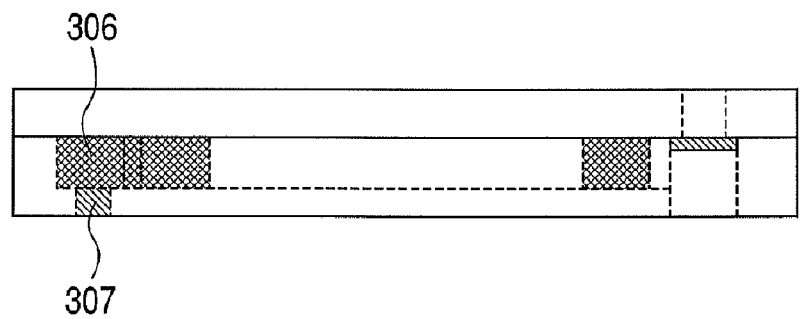

FIG. 15G is a step of injecting a working fluid and sealing the working fluid.

After the working fluid has been injected, sealing is performed. The injection is preferably performed in a vacuum. The sealing is performed with an adhesive.

Figure 15H:
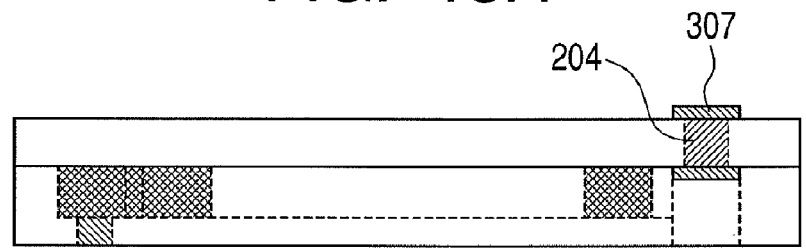

FIG. 15H illustrates a step of injecting a phase transition member 204 and sealing the phase transition member 204. As the phase transition member 204, various members may be selected depending on the object desired to act. For example, paraffin or alcohol may be used.

After the phase transition member has been injected, sealing is performed. In this case, the injection is preferably performed in a vacuum. The sealing is performed with an adhesive.

Figure 16:
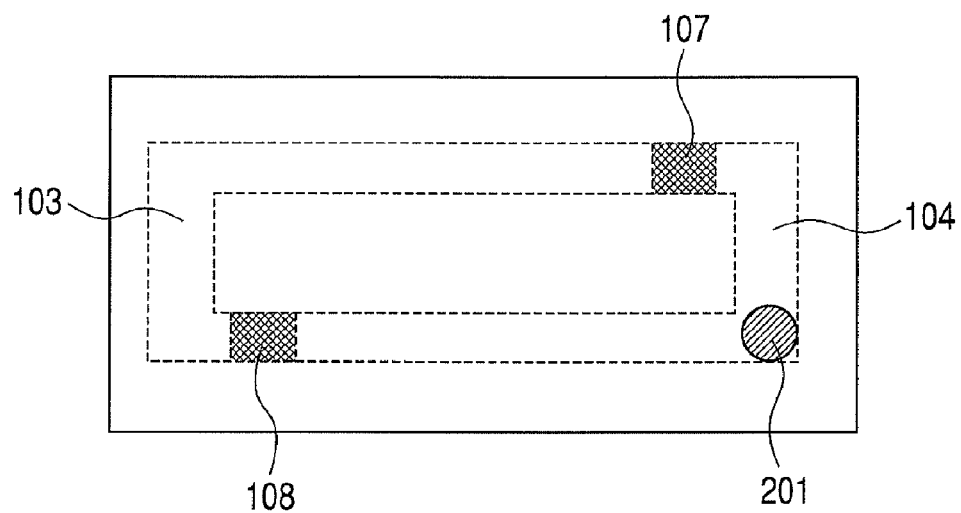
FIG. 16 is a plan view illustrating the loop heat pipe produced by the first production method of Example 4 of the present invention.

By the above-described steps, the loop heat pipe, which has been described in Embodiment 2, can be produced. FIG. 16 is a plan view illustrating the loop heat pipe produced in this way.

Example 5

In Example 5, a second production method of producing the loop heat pipe of Embodiment 2 will be described.

In this heat transfer controlling mechanism, a vaporizing portion and a condensing portion are respectively provided at different layers with a heat insulating layer being interposed therebetween. Further, a heat transfer controlling member of a bimetal is provided.

Although this example describes a case where the semiconductor processing technology is mainly used, the heat pipe may be produced by using mechanical processing technology, such as cutting or pressing.

FIGS. 17A to 17K are views illustrating a second production method of producing the loop heat pipe of Embodiment 2 in this example.

In FIGS. 17A to 17K, the elements that are the same as those described in Example 1 are identified by like numerals, so that the description of common portions will be omitted.

In FIGS. 17A to 17K, reference numeral 308 denotes a sacrificial layer, reference numeral 309 denotes a beam, and reference numeral 310 denotes a heat insulating layer.

In the production method of the loop heat pipe of this example, FIG. 17A illustrates a step of forming a vaporizing portion 103 in a substrate-1 (301).

In the production method for the loop heat pipe of this example, FIG. 13A illustrates a process step of forming vaporizing portion 103 on a substrate 1 (301).

As the substrate, a silicon wafer may be used. The thickness of the silicon wafer is, e.g., 525 µm. Although when ICP-RIE is used in an etching step, there is no restriction on the plane orientation, but when anisotropic wet etching is used, it is desirable to use a silicon wafer having a (100) plane as the surface.

Moreover, when anodization is used for making porous a portion of the flow path in a subsequent step, p-type silicon is used as the substrate.

A photoresist is coated, and patterning is then performed by photolithography. With the patterned photoresist used as a mask, flow paths are formed by ICP-RIE or anisotropic wet etching.

The etching depth is about 300 µm. At this time, a wick 111 for accelerating the reflux may be provided. Moreover, an injection port 304 for injecting the working fluid is also provided.

As the etching, patterning may be performed onto the rear surface by using a similar method to perform etching, or a mask of the front surface may be formed of a two-step mask and two-stage etching may be performed.

As a mask, silicon oxide or aluminum may be used instead of a photoresist having a large film thickness.

FIG. 17B illustrates a step of forming a porous portion 305.

Here, a mask is prepared in advance by using a photoresist, and anodization in which a voltage is applied in a hydrofluoric acid solution is performed to make porous a portion of the substrate.

Moreover, instead of making a portion of the substrate porous, a fine flow path may be formed by etching.

FIG. 17C illustrates a step of performing a surface treatment.

As the method of making a surface hydrophilic, there are used a method of oxidizing a silicon surface, a method of forming a film of titanium oxide on a surface, and the like.

A silane coupling agent or the like may be applied onto a surface to make it hydrophobic.

Moreover, by modifying a surface by PNIPAAm (poly-N-isopropylacrylamide) or PNIPAAmODS (octadodecylsilane), the wettability change at a predetermined temperature may be achieved.

FIG. 17D illustrates a step of forming a condensing portion 104 in a substrate-2 (302). The procedure of this step is similar to that of the first step illustrated in FIG. 17A.

Moreover, FIG. 17E illustrates a step of forming a porous portion 305. The procedure of this step is similar to the second step of FIG. 17B.

Further, FIG. 17F illustrates a step of performing a surface treatment. The procedure of this step is similar to the third step illustrated in FIG. 17C.

Figure 17G:
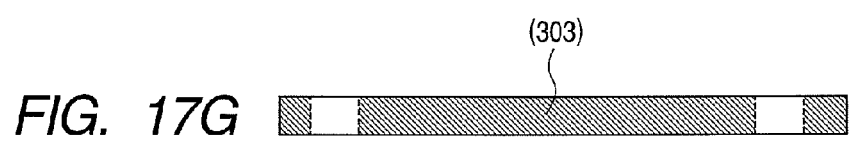

FIG. 17G illustrates a step of forming a flow path in a substrate-3 (303).

As the substrate, a substrate having a heat insulating property is desired. It is desirable to use a surface oxidized or nitrided silicon wafer or a glass wafer.

A substrate having both surfaces polished and having a thickness of, e.g., 525 µm may be used. When ICP-RIE is used for the etching step, there is no restriction on the plane orientation. However, when anisotropic wet etching is used, a silicon wafer having a (100) plane as the surface can be employed.

A photoresist is coated, and patterning is performed by photolithography.

With the patterned photoresist being used as a mask, in the case of a silicon wafer, a flow path is formed by ICP-RIE or anisotropic wet etching. In the case of a glass wafer, a flow path is formed by wet etching using hydrofluoric acid.

Figure 17H:
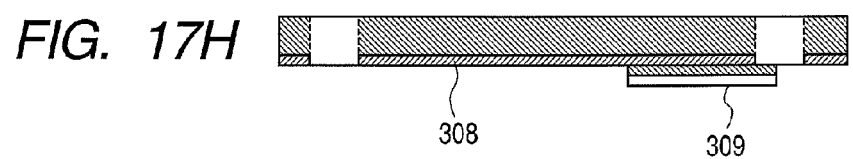

FIG. 17H illustrates a step of producing a heat transfer controlling member.

First, Ni is vapor deposited in a thickness of 5 µm as a sacrificial layer 308. When the film thickness is large, it is also effective to form the film by plating.

An Al film is formed at a thickness of 5 µm as a bimetal lower layer and pattered. For the film formation, sputtering or vacuum vapor deposition may be used.

Moreover, for patterning, a shadow mask may be used at the time of film formation, or wet etching may be used after the film formation.

Various acids and alkalis may be used as etchants. A mixed liquid of phosphoric acid, nitric acid, and acetic acid may be used.

Next, a silicon film is formed at a thickness of 5 μm as a bimetal upper layer and patterned. For the silicon film formation, sputtering may be used.

Further, for the patterning, a shadow mask may be used at the time of the film formation, or dry etching or wet etching may be used after the film formation.

Figure 17I:
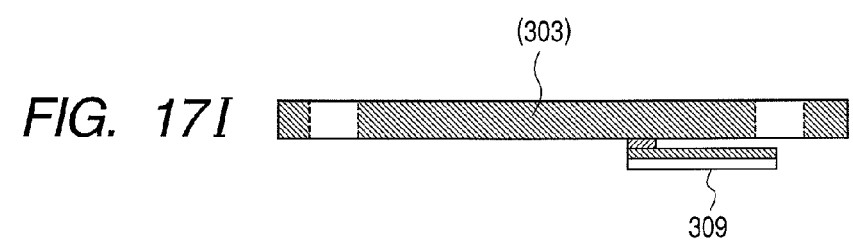

FIG. 17I illustrates a step of etching the sacrificial layer 308.

When Ni as the sacrificial layer is dissolved, a beam 309 is released.

At this time, in order to accelerate etching of the sacrificial layer 308 located below the beam 309, several penetration holes may be provided in the beam 309.

As the etchant, it is necessary to select an etchant such that the upper Al layer is not etched. For example, dilute nitric acid or dilute phosphoric acid may be used.

Figure 17J:
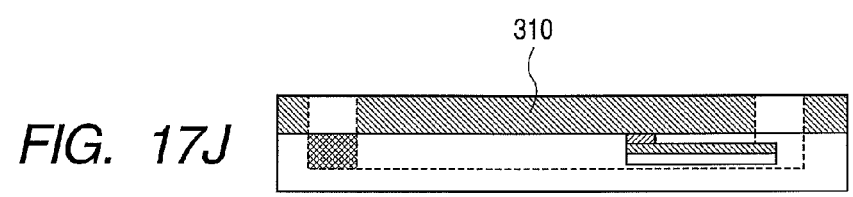

FIG. 17J illustrates a bonding step.

When the substrate-3 (303) is a silicon wafer, diffusion bonding may be used. In the case of Pyrex (trade name) glass, anodic bonding may be used.

It is to be noted that in a case where the surface treated in the preceding surface treatment step is changed, adhesion with an adhesive may be performed.

Figure 17K:
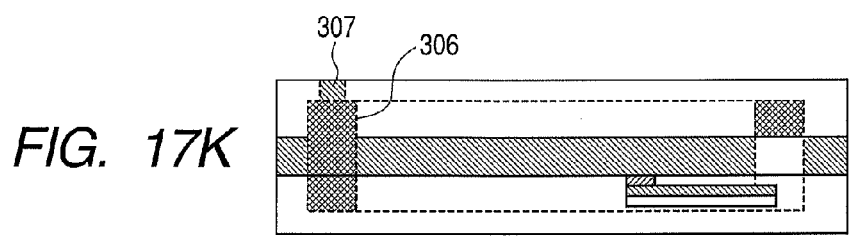

FIG. 17K illustrates a step of injecting a working fluid and sealing the working fluid. After the working fluid is injected, sealing is performed. The injection is preferably performed in a vacuum. The sealing is performed by an adhesive or the like.

By the above-described steps, the loop heat pipe described in Embodiment 2 can be produced.

Although in this example the beam structure of the bimetal with the two-layer structure is used as the heat transfer controlling member, if a TiNi alloy is used as the material, such an alloy can be used as a shape memory alloy.

Moreover, even with a material of a single layer structure, displacement based on thermal expansion can be utilized.

Further, when the heat transfer controlling member is small, or a change in temperature is small so that a displacement sufficient to close the flow path cannot be obtained, a plurality of small-width flow paths may be provided in parallel, and heat transfer controlling members are, respectively, provided in the flow paths.

Figure 18:
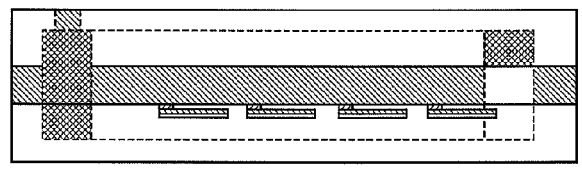
FIG. 18 is a cross-sectional view illustrating the configuration of the loop heat pipe of Example 5 of the present invention.

In addition, as shown in FIG. 18, a plurality of heat transfer controlling members may be arranged to increase the flow path resistance to thereby reduce the heat transfer amount, even if the flow path cannot be closed.

Example 6

In Example 6, a fuel cell system in which the heat transfer controlling mechanism of the present invention is used for heat exchange control between a fuel cell and a fuel tank will be described.

Figure 19:
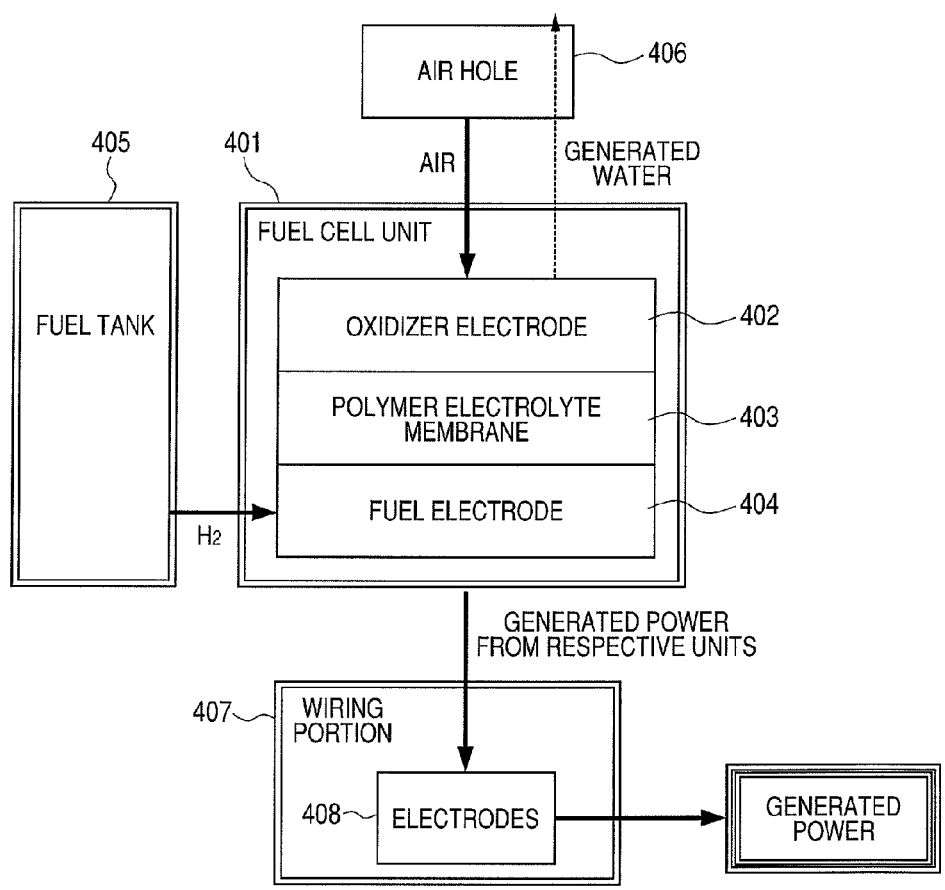
FIG. 19 is a schematic diagram illustrating a fuel cell system of Example 6 of the present invention.

FIG. 19 is a schematic diagram illustrating the fuel cell system of this example.

The fuel cell system of this example includes an air hole 406 for taking, from outside air, oxygen used as an oxidizer in a power generation reaction.

Moreover, the hole also serves to discharge generated water to the outside as water vapor. Air may be taken in by natural diffusion or may be supplied by a fan or the like.

Further, on one side surface, there are provided electrodes 408 for extracting electricity.

The inside of the fuel cell system includes a polymer electrolyte membrane 403, a fuel electrode 404, an oxidizer electrode 402, a fuel cell unit 401 including a catalyst, a fuel tank 405 for storing a fuel, and a wiring portion 407 for collecting electricity, which has been generated by respective fuel cell units.

The dimensions of the fuel cell system of this embodiment are 50 mm×30 mm×10 mm.

Respective elements of the fuel cell system of the present invention will now be described in detail. First, the fuel cell unit 401 will be described.

In the fuel cell unit, fuel (hydrogen) is supplied to the fuel electrode 404, and an oxidizer (oxygen or air) is supplied to the oxidizer electrode 402. Thus, a catalytic reaction takes place. As a result, power generation is performed.

At that time, water is produced as a product. The reaction formulae in the fuel electrode 404 and the oxidizer electrode 402 are expressed as described below.

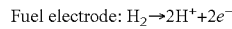

Fuel electrode: $H_2 \rightarrow 2H^+ + 2e^-$

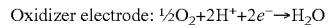

Oxidizer electrode: $\frac{1}{2}O_2 + 2H^+ + 2e^- \rightarrow H_2O$

As is seen from the above formulae, there is a proportional relationship between the amount of obtained electricity and the amount of consumed hydrogen.

When it is assumed that power generation of a current value of I (A) is performed, the amount of consumed hydrogen becomes $5.1 \times 10^{-6} \times I$ (mol/s).

Moreover, heat is produced accompanying the power generation. The theoretical heat generation amount is calculated as described below. When it is assumed that the power generation amount is P (W]) and the electromotive force per each fuel cell unit is v (V), the heat generation amount $H_c$ is expressed as described below.

Heat Generation Amount $H_c = P \times (v_0 - v) \div v = I \times (v_0 - v)$, wherein $v_0$ is the theoretical open circuit voltage (1.23 (V) at 25° C.). Since the fuel cell is generally used at about 0.6 V for each fuel cell unit, heat that is approximately identical to the generated power is produced.

The fuel tank 405 will now be described.

It is assumed that hydrogen is used as a fuel in this example. The case where the tank is filled with a hydrogen storage alloy will be described.

In general, since the withstand pressure of a polymer electrolyte membrane used in the fuel cell is 0.3 to 0.5 MPa, it is preferable that the fuel cell be used in a state where the differential pressure between the inside of the fuel cell and the outside air is within the range of 0.1 MPa or less.

For example, as a hydrogen storage alloy having the characteristic such that the release pressure of hydrogen is 0.2 MPa at ordinary temperature, $LaNi_5$ may be used.

When it is further assumed that the volume of the fuel tank is one-half of the volume of the entire fuel cell system and the thickness of the tank wall is 1 mm, the volume of the fuel tank is calculated to be about 5.2 cm³.

Since $LaNi_5$ can absorb/release 1.1 wt. % of hydrogen in terms of weight, when the filling rate is assumed to be 50%, the amount of hydrogen stored within the fuel tank is 0.2 g, so that the amount of energy that can be generated is calculated to be about 5.7 (W·hr).

FIG. 20 shows a change in the hydrogen release rate of $LaNi_5$ depending on temperature.

In general, in the case of a hydrogen storage alloy, with a decrease in temperature, the hydrogen release rate is reduced. Moreover, since the hydrogen release reaction is an endothermic reaction, the temperature is decreased with the release of hydrogen, whereby the hydrogen release rate is reduced. Accordingly, in order to obtain a hydrogen release amount sufficient for power generation during fuel cell power generation, it is necessary to prevent a decrease in the temperature of the fuel tank.

In general, in the case of a hydrogen storage alloy, with an increase in temperature, the dissociation pressure of hydrogen increases.

FIG. 21 shows a change in dissociation pressure of $LaNi_5$ depending on temperature.

As is seen from FIG. 21, when the temperature inside the fuel tank exceeds 50° C., the internal pressure of the tank exceeds 4 atm. However, producing a fuel tank so as to tolerate such a high pressure leads to an increase in the weight of the fuel tank. Moreover, this may cause a disadvantage in that a valve provided between the fuel tank and the fuel cell, for controlling the pressure of the fuel, does not normally operate.

Accordingly, in order to prevent an abnormal elevation of the pressure inside the fuel tank, it is necessary to prevent an excessive amount of heat produced by power generation and heat supplied from the outside from being transferred to the fuel tank.

Figure 22:
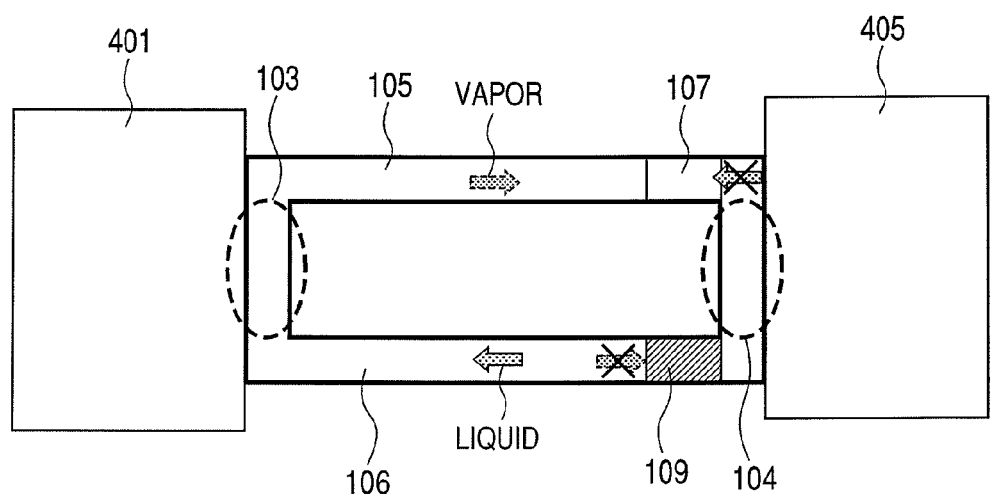
FIG. 22 is a diagram illustrating a configuration example in which a loop heat pipe is used for heat exchange between a fuel tank and a fuel cell as a heat transfer controlling mechanism of the fuel cell system of Example 6 of the present invention.

FIG. 22 is a schematic diagram illustrating a configuration example of a heat transfer controlling mechanism in which the loop heat pipe described in Example 1 is used for heat exchange between the fuel tank 405 and the fuel cell unit 401 of the fuel cell. Specifically, in FIG. 22, there is adopted a configuration in which the vaporizing portion 103 is disposed adjacent to the fuel cell 401 (on the fuel cell unit side), and the condensing portion 104 is disposed adjacent to the fuel tank 405 (on the fuel tank side).

When power generation is started, the fuel cell 401 produces heat. With the progress of the release of hydrogen, the temperature inside the fuel tank 405 is lowered.

Accordingly, since the wettability changing portion 109 is hydrophilic, the working fluid is circulated, so that heat exchange is actively performed. With the progress of the heat exchange, the temperature inside the fuel tank 405 is elevated, and when the temperature of the wettability changing portion 109 exceeds 35° C., the wettability changing portion 109 is hydrophobic.

Thus, the condensed working fluid cannot re-flow by the interruption of the wettability changing portion, whereby the function of the heat pipe is suspended.

As described above, the temperature and internal pressure of the fuel tank 405 can be controlled.

Although in this example the loop heat pipe described in Example 1 is used as the heat transfer controlling mechanism, even with a heat transfer controlling mechanism of the present invention of another configuration, similar effects can be obtained.

Example 7

In Example 7, a radiation amount controlling mechanism in a fuel cell system to which the present invention is applied will be described.

Figure 23:
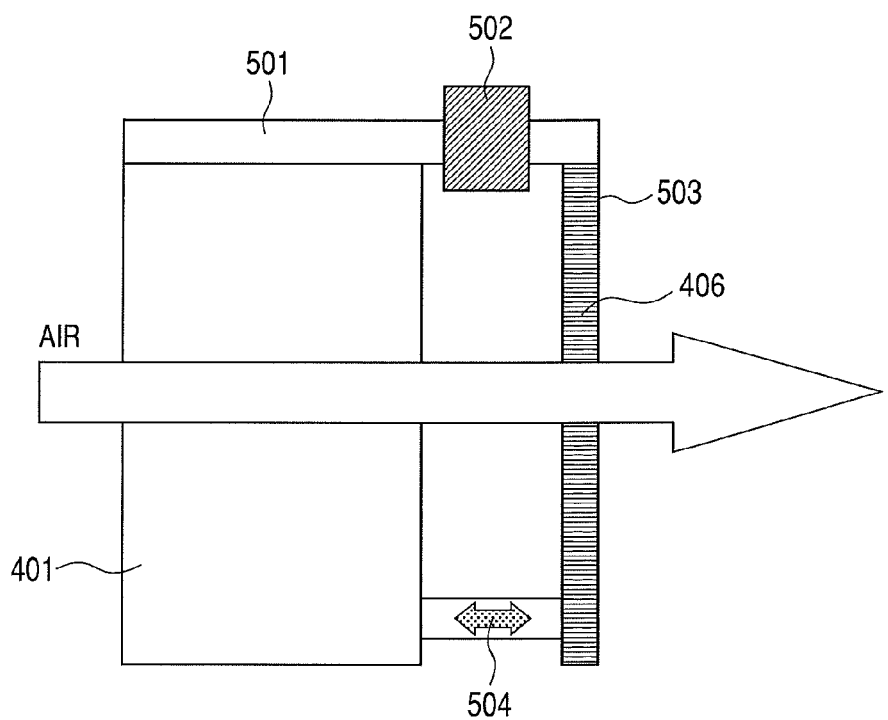
FIG. 23 is a diagram illustrating a radiation amount controlling mechanism of a fuel cell system of Example 7 of the present invention.

FIG. 23 is a diagram illustrating the radiation quantity controlling mechanism of this example.

The fundamental configuration of the fuel cell system in this example is similar to the system described in Example 6 with reference to FIG. 19.

However, in this example, a member having air holes 406 is used as a radiating plate 503, the fuel cell 401 and the radiating plate 503 are thermally connected by a heat transfer member 501, and a thermal switch 502 is provided as a thermal junction therebetween.

At this time, it is preferable that the radiating plate 503 and the heat transfer member 501 each have a high thermal conductivity, and, for example, a metal such as copper, graphite, or silicone rubber may be used.

The thermal switch 502 serves, when the temperature reaches a predetermined temperature or more, to thermally connect the fuel cell 401 and the radiating plate 503.

Such a thermal switch 502 may be made of a bimetal or a shape memory alloy.

Thus, when the temperature of the fuel cell 401 is low (power generation in an initial stage or power generation when the output is low or the outside air temperature is low), the thermal switch is in an OFF state, so that power generation can be performed in a state where the activity of the fuel cell is high without releasing heat from power generation to the outside.

When the temperature of the fuel cell 401 becomes high, the thermal switch 502 is switched to an ON state, so that heat is released to the outside through the radiating plate 503, whereby it is possible to prevent an excessive increase in the temperature of the fuel cell 401.

The passage of air through the air holes 406 may be attained by natural diffusion, but when a fan or the like is used, the radiation efficiency can be improved.

Further, when a cathode flow path and the radiating plate of the fuel cell are connected through a water flow path 504, water produced accompanying power generation can be transported to the radiating plate.

Thus, the heat of vaporization of produced water can be utilized for radiation, so that the radiation efficiency can be further improved and excess water can be discharged to the outside.

As the water flow path 504, for example, fibers having a water absorbing property can be used to guide water to the radiating plate 503 by a capillary force.

Figure 24:
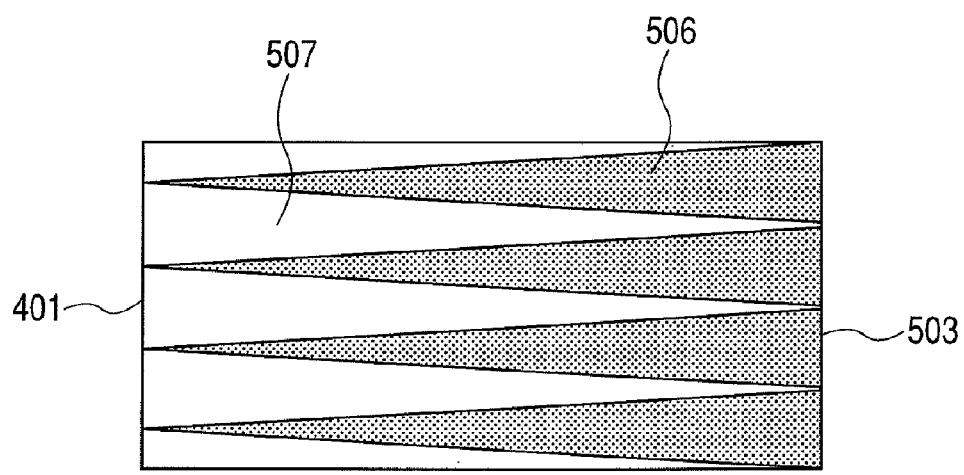
FIG. 24 is a diagram illustrating a configuration example in which a pattern having hydrophilicity and hydrophobicity is formed to enable movement of water in Example 7 of the present invention.

Moreover, as shown in FIG. 24, a pattern including a hydrophilic portion 506 and a hydrophobic portion 507 is formed between the fuel cell 401 (cathode flow path) and the radiating plate 503 of the fuel cell to thereby move water.

In this case, unlike the case utilizing a capillary force, water can be moved irrespective of the amount held in the radiating plate.

Moreover, when a water absorbing member, such as a water absorbing agent, is provided on the surface of the radiating plate, water can be stored on the radiating plate.

Figure 25:
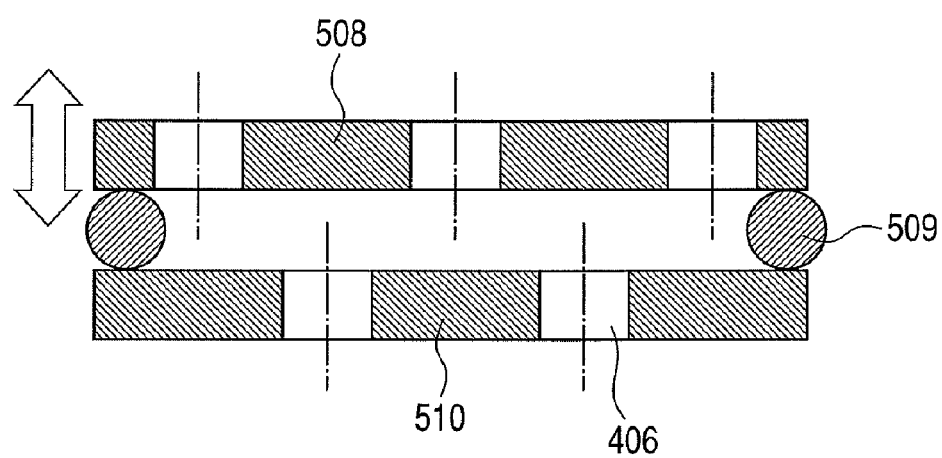
FIG. 25 is a diagram illustrating a configuration example in which the air permeation rate of air holes is changed by absorbed water amount in Example 7 of the present invention.

Further, as shown in FIG. 25, by adopting a configuration in which the air permeation rate of the air holes is changed by absorbing water, the air permeation rate can be increased in a wet state.

When the loop heat pipes as described in Examples 1 to 5 are used as the thermal switch 502, the heat transfer efficiency at the switch can be improved.

Figure 26:
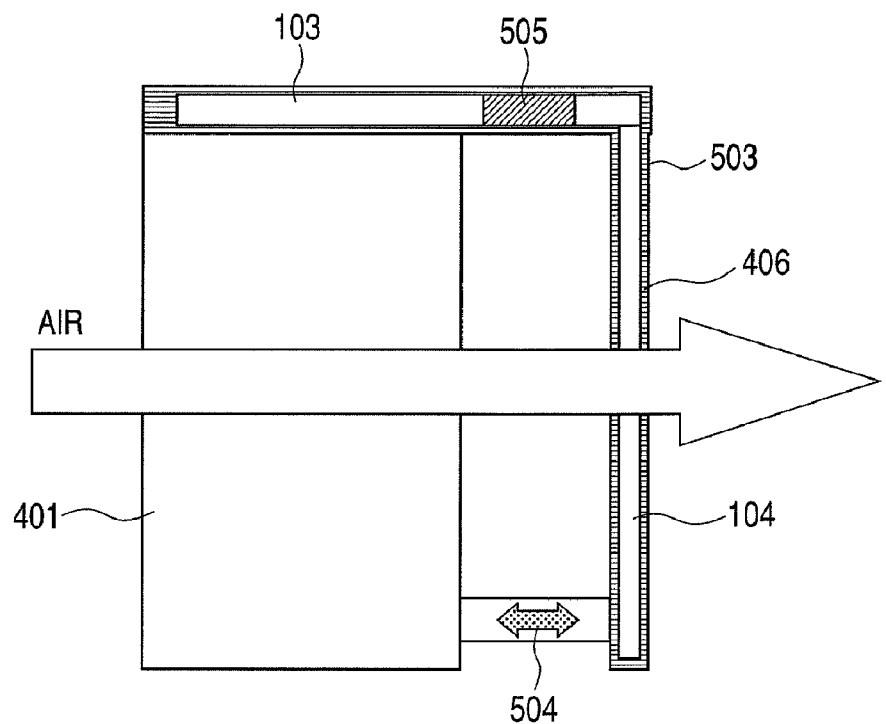
FIG. 26 is a diagram illustrating a configuration example in which a thermal switch is used for the loop heat pipe in Example 7 of the present invention.

Particularly, by employing a configuration of the heat pipe as shown in FIG. 26, including the heat transfer member 501 and the radiating plate 503, it is possible to improve the heat transfer efficiency and to make a temperature variation of the radiating plate uniform.

Namely, by employing the configuration in which the vaporizing portion 103 is provided adjacent to the fuel cell 401, the condensing portion 104 is provided adjacent to the radiating plate 503, and a heat transfer controlling member 505 is used as a thermal switch 502, it is possible to improve the heat transfer efficiency and to make the temperature variance of the radiating plate uniform.

Example 8

In Example 8, a radiation quantity controlling mechanism of a fuel cell of a form different from that of Example 7 will be described.

Figure 27:
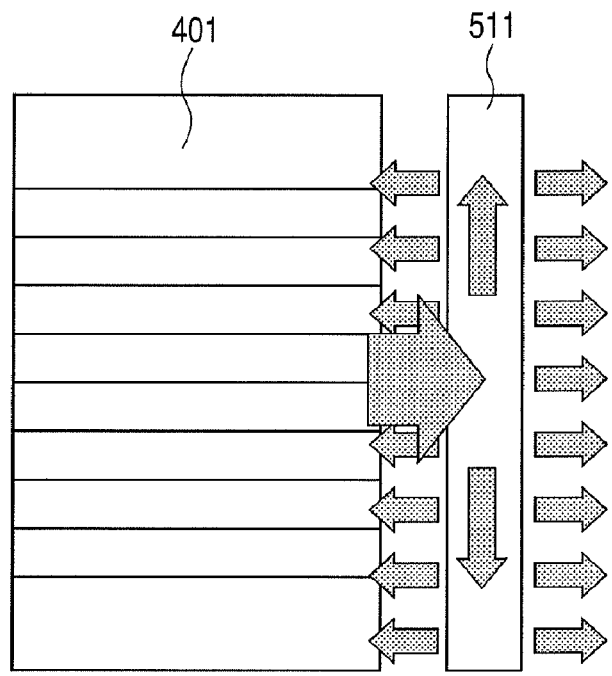
FIG. 27 is a diagram illustrating a radiation amount controlling mechanism of a fuel cell system of Example 8 of the present invention.

FIG. 27 is a diagram illustrating a radiation amount controlling mechanism of this example.

The fundamental configuration of the fuel cell system in this example is similar to that of the system described in Example 6 with reference to FIG. 19.

However, in this example, as shown in FIG. 27, a heat spreader 511 is provided adjacent to the fuel cell 401.

When a fuel cell is used particularly in the form of a stack, there is a tendency such that in a fuel cell unit located in the vicinity of the central portion of the stack, heat will reside to increase the temperature, and the temperature of a fuel cell unit in the vicinity of the end of the stack becomes low.

When there is generated a variance of temperature in the fuel cell stack, there appears a difference in the humidity of the electrolyte membrane, so that a variance of the characteristics will be generated.

As shown in FIG. 27, when the heat spreader 511 is provided, heat produced at the stack is first transferred to the heat spreader 511. The heat thus transferred is uniformly distributed in the heat spreader and then returns to the fuel cell stack, so that the unevenness of the temperature of the stack is reduced. Such a heat spreader 511 preferably has a high thermal conductivity in the plane direction, and for example, a metallic plate, such as aluminum or copper and graphite, are suitably used.

Further, by applying a ceramic sheet to the surface, or by painting the surface of the heat spreader 511 and the fuel cell 401 in black, the emissivity in thermal radiation can be increased, so that the transfer of heat between the fuel cell 401 and the heat spreader 511 can be efficiently performed in a non-contact mode by heat radiation.

Figure 28:
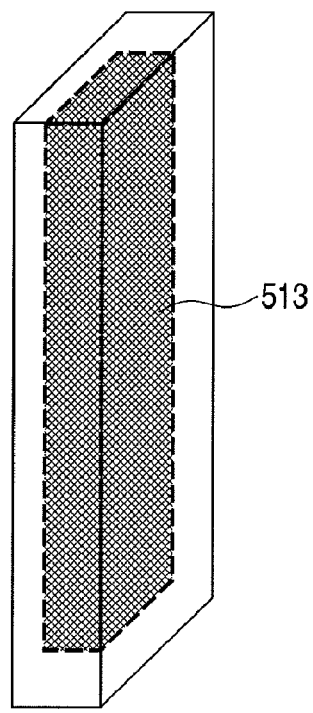
FIG. 28 is a perspective view illustrating a configuration example in which a mesh having a capillary force or the like is put into a hollow heat spreader and a working fluid is sealed therein to provide a heat pipe in Example 8 of the present invention.

Further, as shown in FIG. 28, by making a heat spreader 511 hollow, inserting a mesh 513 having a capillary force or the like into the hollow portion, and sealing a working fluid, a heat pipe can be provided to improve the heat transport efficiency.

Figure 29:
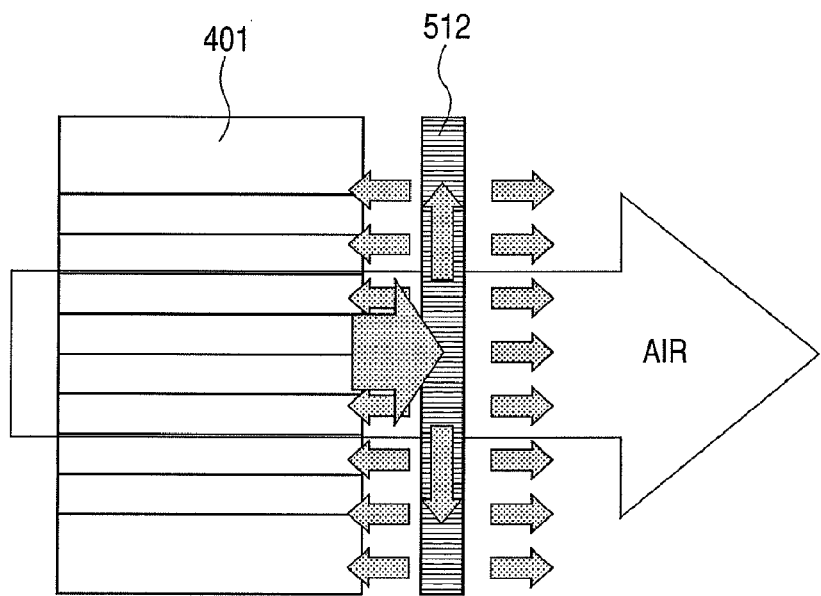
FIG. 29 is a diagram illustrating a configuration example in which air holes are provided in a heat spreader so that the heat spreader is used as a radiating plate in Example 8 of the present invention.

Moreover, as shown in FIG. 29, by providing air holes in a heat spreader, the heat spreader 512 with air holes can be formed and used.

Figure 30:
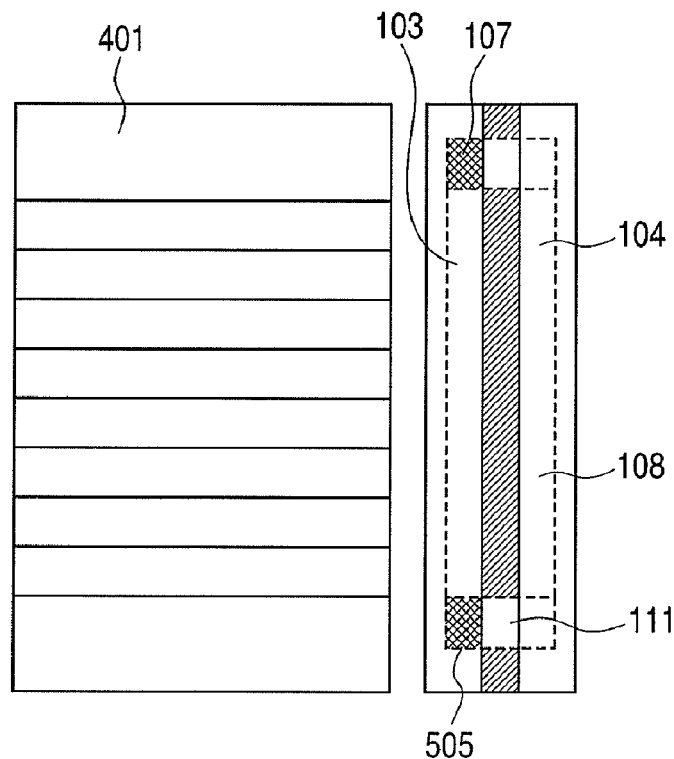
FIG. 30 is a diagram illustrating a configuration example in which the loop heat pipe of Example 3 is used as a heat spreader in Example 8 of the present invention.

Specifically, a configuration in which the loop heat pipe described in Example 3 is used as a heat spreader is illustrated in FIG. 30.

The vaporizing portion 103 of the heat pipe faces the fuel cell 401, and the condensing portion 104 is located on a side opposite thereto.

Thus, when the temperature of the fuel cell unit 401 is low (power generation in an initial stage or power generation when the output is low or the outside air temperature is low), the working fluid becomes difficult to circulate by means of the heat transfer controlling member 505. Therefore, the heat resulting from power generation is not discharged to the outside and can rather be stored in the fuel cell, so that power generation can be performed in a state in which the activity of the fuel cell is high.

When the temperature of the fuel cell 401 becomes high, the heat transfer controlling member 505 circulates the working fluid, so that heat is discharged to the outside through the heat spreader 512, whereby the elevation of the temperature of the fuel cell 401 can be prevented.

When the air holes 406 are provided, the passage of air through the air holes 406 may be attained by natural diffusion, but when a fan or the like is used, the radiation efficiency can be improved.

Figure 31:
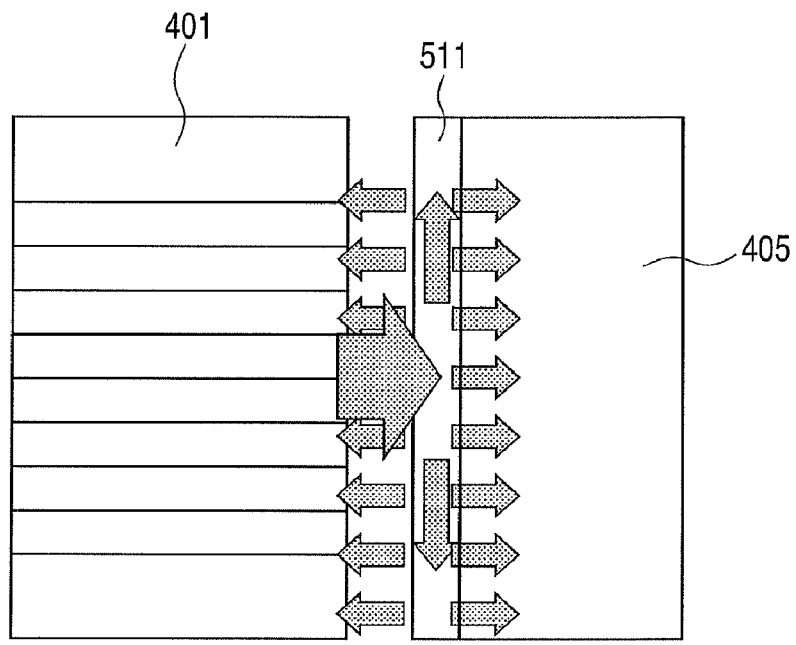
FIG. 31 is a diagram illustrating a configuration example in which a heat spreader is provided between a fuel cell and a fuel tank in Example 8 of the present invention.

Moreover, as shown in FIG. 31, a heat spreader 511 may be provided between a fuel cell 401 and a fuel tank 405.

In this case, the heat resulting from the power generation of the fuel cell 401 can be uniformly distributed in the stack to eliminate a variance, and the generated heat can be subjected to a thermal exchange between the fuel cell 401 and the fuel tank 405 as is the case with Example 6.

Figure 32:
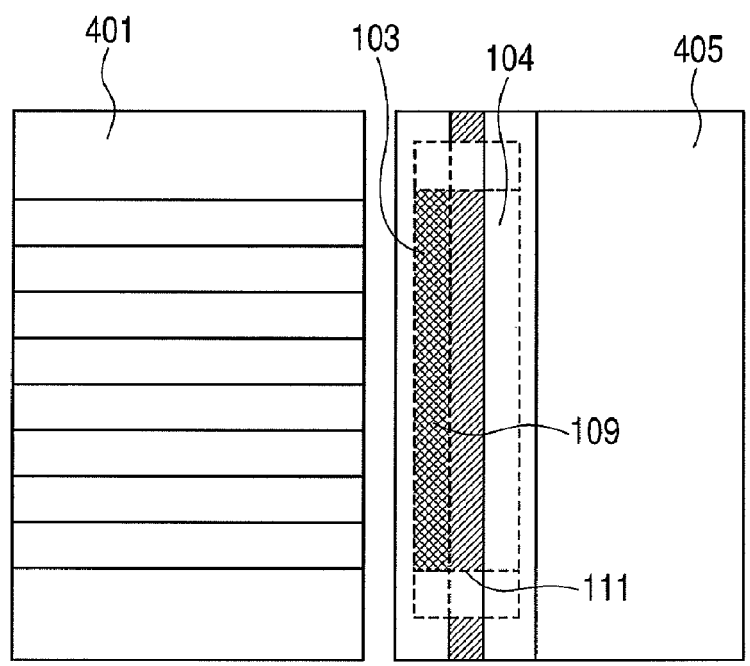
FIG. 32 is a diagram illustrating a configuration example in which only when the temperature of a fuel cell becomes a predetermined temperature or more, heat is transferred to a fuel tank in Example 8 of the present invention.

Particularly, as illustrated in FIG. 32, by adopting a configuration in which a heat spreader is constituted by using a heat transfer controlling mechanism of the present invention, heat can be transferred to the fuel tank 405 only when the temperature of the fuel cell 401 reaches a predetermined temperature or more.

Figure 33:
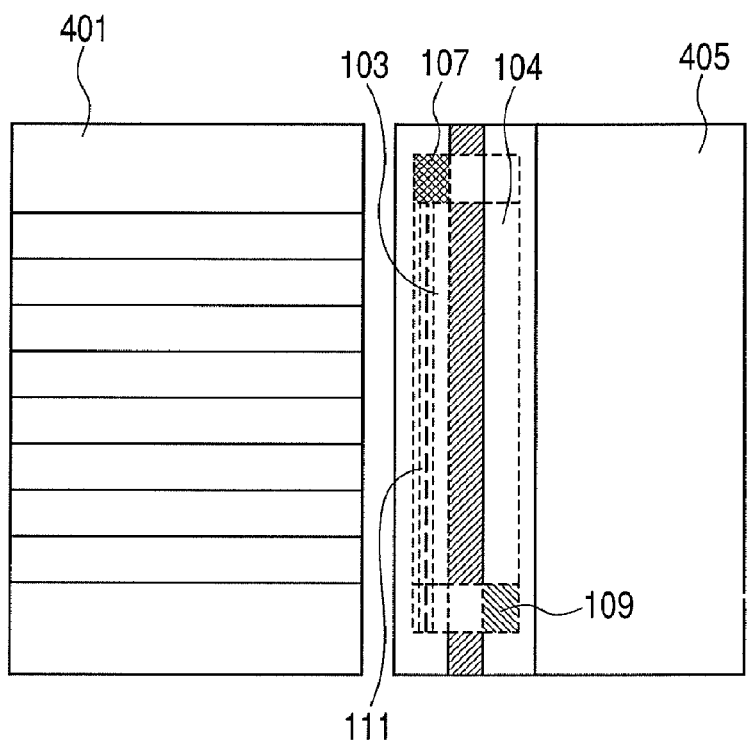
FIG. 33 is a diagram illustrating a configuration example in which only when the temperature of a fuel tank becomes less than a predetermined temperature, heat is transferred to a fuel tank in Example 8 of the present invention.

When a configuration such as illustrated in FIG. 33 is adopted, heat can be transferred to the fuel tank 405 only when the temperature of the fuel tank 405 is less than a predetermined temperature.

Incidentally, although the stack fuel cell is used in the present example, the present invention can also be applied to a case where a plurality of fuel cells are arranged in the same plane and used or to a single unit fuel cell.

The heat transfer controlling mechanism of the present invention improves performance, reduced the size, and decreases power consumption of a heat pipe. It is particularly useful for improving performance involved in the thermal control, as well as the size reduction of a fuel cell using a polymer electrolyte membrane.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2006-293329, filed October 27, which is hereby incorporated by reference herein in its entirety.

The invention claimed is:

1. A heat transfer controlling mechanism comprising:
   a vaporizing portion;
   a condensing portion;
   a loop-shaped flow path connecting the vaporizing portion and the condensing portion such that a working fluid is sealed therein;
   a gas passage suppressing portion provided on one side in the loop-shaped flow path, for allowing a liquid to pass therethrough and suppressing passage of a gas; and
   a liquid passage suppressing portion provided on another side in the loop-shaped flow path, for allowing a gas to pass therethrough and suppressing passage of a liquid,
   wherein the heat transfer controlling mechanism performs a heat transport by an action of vaporization of the working fluid in the vaporizing portion and by an action of condensation of the working fluid in the condensing portion to thereby control transfer of heat, and
   wherein at least one of the gas passage suppressing portion and the liquid passage suppressing portion comprises a wettability changing portion comprising a material whose contact angle is changed at a predetermined temperature.

2. The heat transfer controlling mechanism according to claim 1, wherein the wettability changing portion comprises a material whose property changes from hydrophilicity to hydrophobicity at a predetermined temperature or more.

* * * * *